United States Patent
Lakes et al.

(10) Patent No.: US 10,546,327 B2
(45) Date of Patent: Jan. 28, 2020

(54) REDIRECTION SERVICE

(71) Applicants: Jesse Lakes, Bethesda, MD (US); Jesse Pasichnyk, Seattle, WA (US)

(72) Inventors: Jesse Lakes, Bethesda, MD (US); Jesse Pasichnyk, Seattle, WA (US)

(*) Notice: Subject to any disclaimer, the term of this patent is extended or adjusted under 35 U.S.C. 154(b) by 0 days.

(21) Appl. No.: 15/055,809

(22) Filed: Feb. 29, 2016

(65) Prior Publication Data

US 2016/0217504 A1 Jul. 28, 2016

Related U.S. Application Data

(63) Continuation of application No. 14/485,783, filed on Sep. 14, 2014, now Pat. No. 9,276,994, which is a continuation of application No. 13/340,480, filed on Dec. 29, 2011, now Pat. No. 8,838,767.

(60) Provisional application No. 61/428,491, filed on Dec. 30, 2010.

(51) Int. Cl.
| | |
|---|---|
| G06F 15/173 | (2006.01) |
| G06Q 30/02 | (2012.01) |
| G06F 16/9535 | (2019.01) |
| G06F 16/955 | (2019.01) |
| H04L 29/08 | (2006.01) |
| H04L 12/26 | (2006.01) |
| H04L 29/12 | (2006.01) |

(52) U.S. Cl.
CPC ..... *G06Q 30/0277* (2013.01); *G06F 16/9535* (2019.01); *G06F 16/9558* (2019.01); *G06F 16/9566* (2019.01); *G06Q 30/0256* (2013.01); *H04L 43/06* (2013.01); *H04L 67/02* (2013.01); *H04L 67/18* (2013.01); *H04L 67/327* (2013.01); *H04L 61/609* (2013.01)

(58) Field of Classification Search
CPC ........ G06F 17/30864; G06F 17/30554; G06F 17/30876; G06F 17/30887; G06F 17/30882; G06F 16/9566; G06F 16/9535; G06F 16/9558; G06F 16/951; G06F 16/955; H04L 67/18; H04L 67/2814
See application file for complete search history.

(56) References Cited

U.S. PATENT DOCUMENTS

| | | | |
|---|---|---|---|
| 9,276,994 B2 * | 3/2016 | Lakes | H04L 67/327 |
| 9,838,457 B2 * | 12/2017 | Lakes | H04L 67/02 |
| 2002/0029290 A1 * | 3/2002 | Burema | G06F 11/3476 709/238 |
| 2002/0147790 A1 * | 10/2002 | Snow | G06F 16/9535 709/217 |

(Continued)

*Primary Examiner* — Farid Homayounmehr
*Assistant Examiner* — Lizbeth Torres-Diaz
(74) *Attorney, Agent, or Firm* — Brian J. Pangrle

(57) ABSTRACT

A method can include receiving a URL via an interface of a computing system responsive to activation of an Internet link by a remote user device wherein the Internet link is associated with a webpage ad for an item where the URL comprises user device data and ad data; based at least in part on the user device data, via the computing system, determining a geolocation of the user device; based at least in part on the ad data, via the computing system, determining information about the item; based at least in part on the geolocation of the user device and the information about the item, via the computing system, generating search results; and via the computing system, communicating the generated search results to the user device.

15 Claims, 25 Drawing Sheets

(56) References Cited

U.S. PATENT DOCUMENTS

| | | | |
|---|---|---|---|
| 2005/0097107 A1* | 5/2005 | Burt | G06F 16/951 |
| 2005/0273388 A1* | 12/2005 | Roetter | G06Q 30/02 |
| | | | 705/14.4 |
| 2007/0192289 A1* | 8/2007 | Lin | G06F 16/9537 |
| 2008/0027813 A1* | 1/2008 | Kogure | G06Q 30/02 |
| | | | 705/14.68 |
| 2008/0133540 A1* | 6/2008 | Hubbard | H04L 63/101 |
| 2008/0140542 A1* | 6/2008 | Perron | G06Q 20/3224 |
| | | | 705/27.1 |
| 2008/0167992 A1* | 7/2008 | Kokernak | G06Q 10/0637 |
| | | | 705/51 |
| 2010/0058160 A1* | 3/2010 | Navarro | G06Q 10/0637 |
| | | | 715/208 |
| 2011/0137742 A1* | 6/2011 | Parikh | G06Q 20/04 |
| | | | 705/26.1 |
| 2011/0313832 A1* | 12/2011 | Herbrich | G06Q 30/0214 |
| | | | 705/14.16 |

* cited by examiner

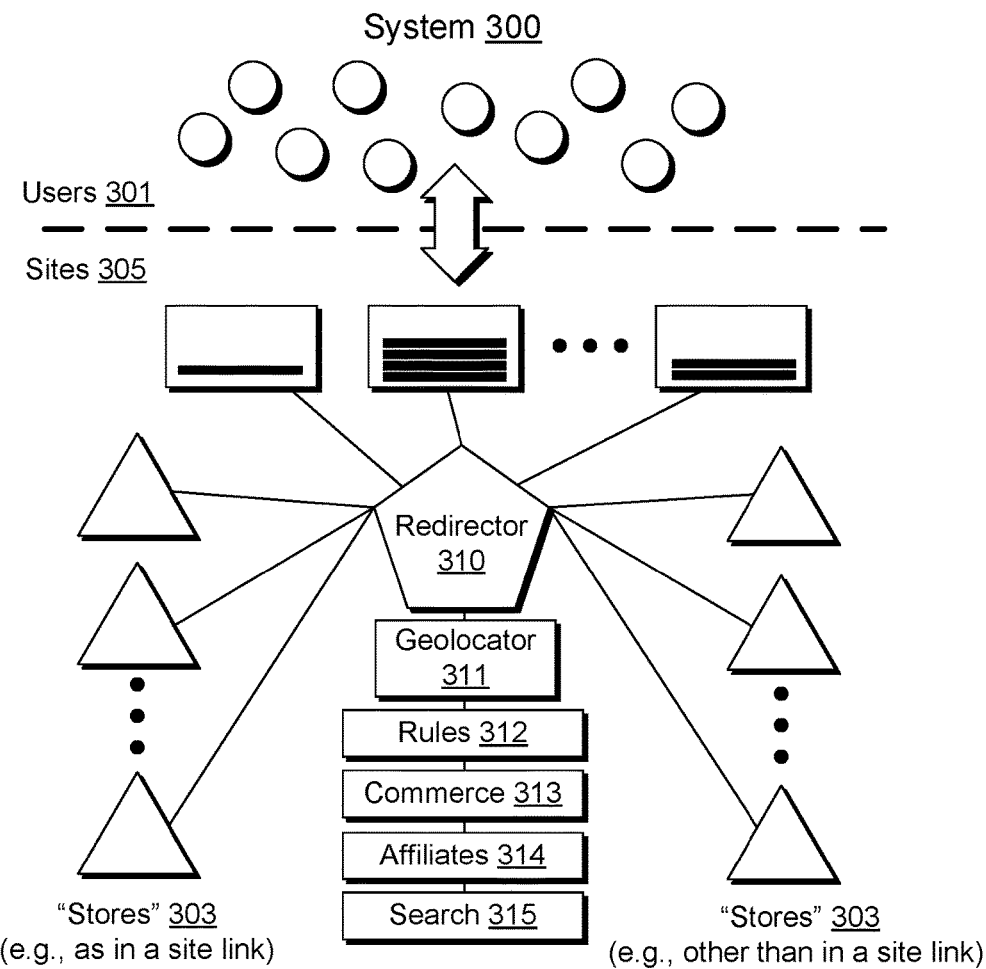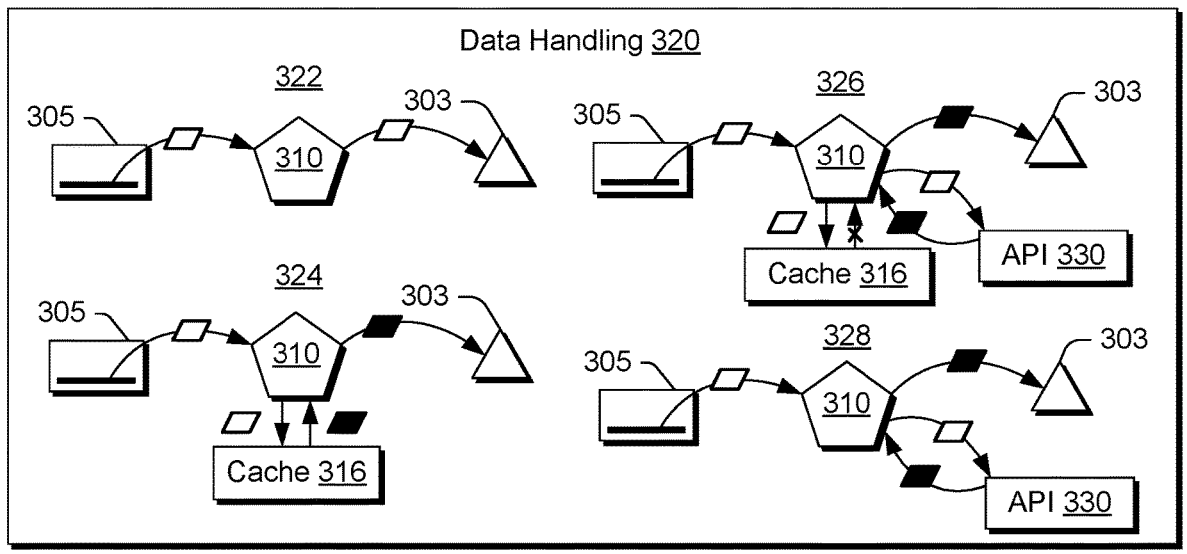
Fig. 3

Method 1700
(continued)

See Fig. 17

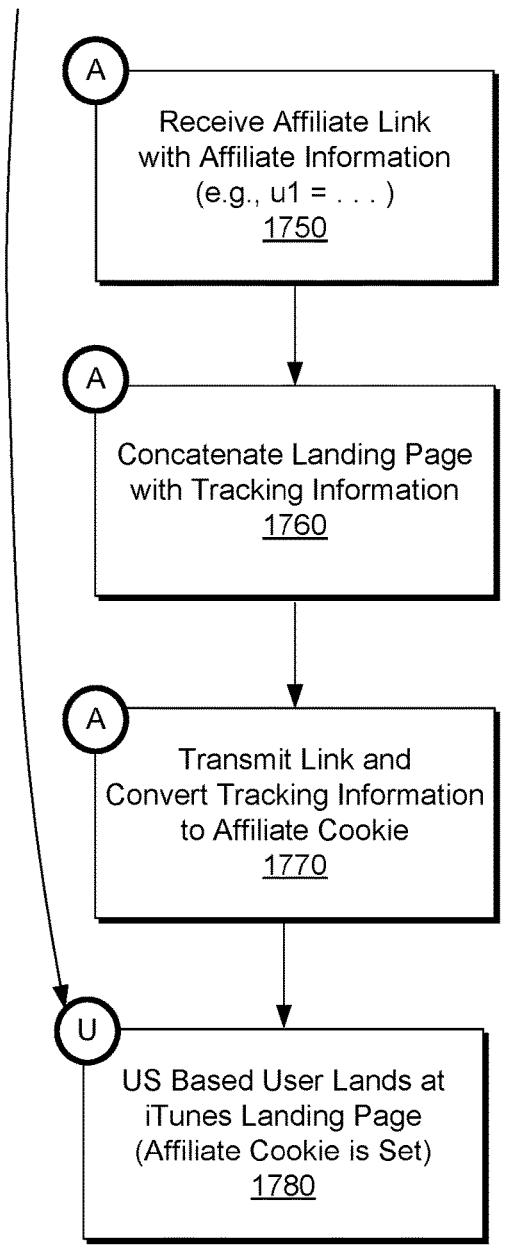

1750 Receive Affiliate Link with Affiliate Information (e.g., u1 = ...)

http://click.linksynergy.com/fs-bin/stat?id=CBIMI*gYY/8&offerid=146261&type=3&subid=0&tmpid=1826&RD_PARM1=http%253a%252f%252fitunes.apple.com%252fus%252falbum%252fid362133451%253fi%253d362133505%2526partnerId%253d30&u1=1-index-0-US

1760 Concatenate Landing Page with Tracking Information

LP: http://itunes.apple.com/us/album/id362133451?i=362133505 &
TI: partnerId=30&partnerId=30&siteID =CBIMI.gYY_8-kK6paOg9L1w2Ol3GN1ok2A

Redirect from Affiliate

1770 Transmit Link and Convert Tracking Information to Affiliate Cookie http://itunes.apple.com/us/album/id362133451?i=362133505&partnerId=30&partnerId=30&siteID =CBIMI.gYY_8-kK6paOg9L1w2Ol3GN1ok2A

Final Destination for User

1780 US Based User Lands at iTunes Landing Page (Affiliate Cookie is Set)

http://itunes.apple.com/us/album/id362133451?i=362133505

Fig. 18

See Fig. 19

Method 1900 (continued)

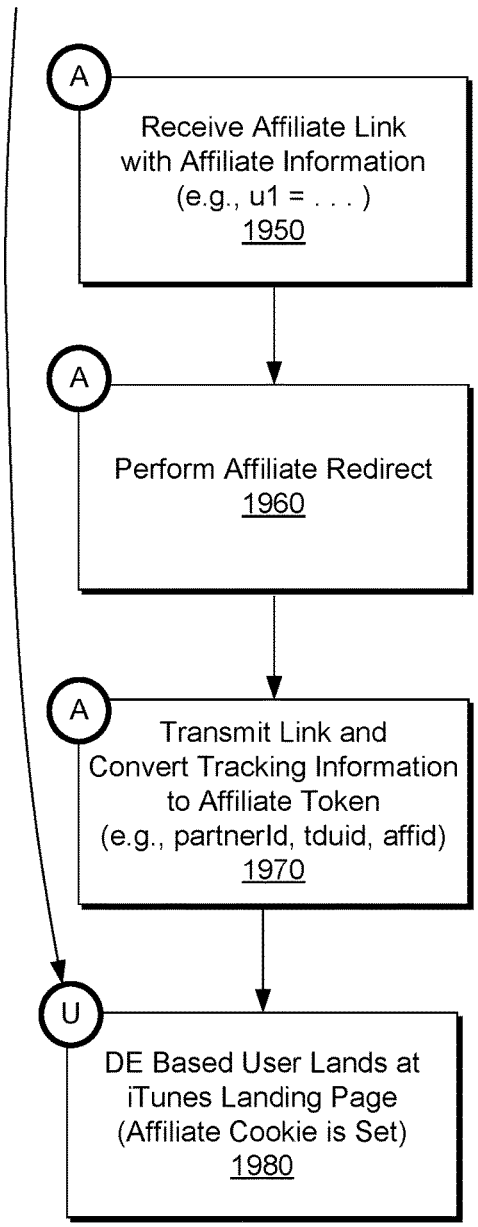

Receive Affiliate Link with Affiliate Information (e.g., u1 = . . . ) 1950 http://clk.tradedoubler.com/click?p=23761&a=1723000&epi=10_active_18d3ba9d-f0fb-494c-92d1-a52b19835a42&url=http%3a%2f%2fitunes.apple.com%2fde%2falbum%2fid269911546%3fi%3d26991 1950%26partnerId%3d2003

Perform Affiliate Redirect 1960 http://solutions.tradedoubler.com/redirect/itunesredir/td redirect.php?programId=23761&affId=1723000&tduid=64fd3d5dde2dbc8d9c43dc74aeebc19b&url=http://itunes.apple.com/de/album/id269911546?i=269911950&partnerId=2003

Transmit Link and Convert Tracking Information to Affiliate Token (e.g., partnerId, tduid, affid) 1970

Redirect from Affiliate http://itunes.apple.com/de/album/id269911546?i=269911950&partnerId=2003&tduid=64fd3d5dde2dbc8d9c43dc74aeebc19b&affId=1723000

DE Based User Lands at iTunes Landing Page (Affiliate Cookie is Set) 1980

Final Destination for User http://itunes.apple.com/de/album/id269911546?i=269911950&affId=1723000

Fig. 20

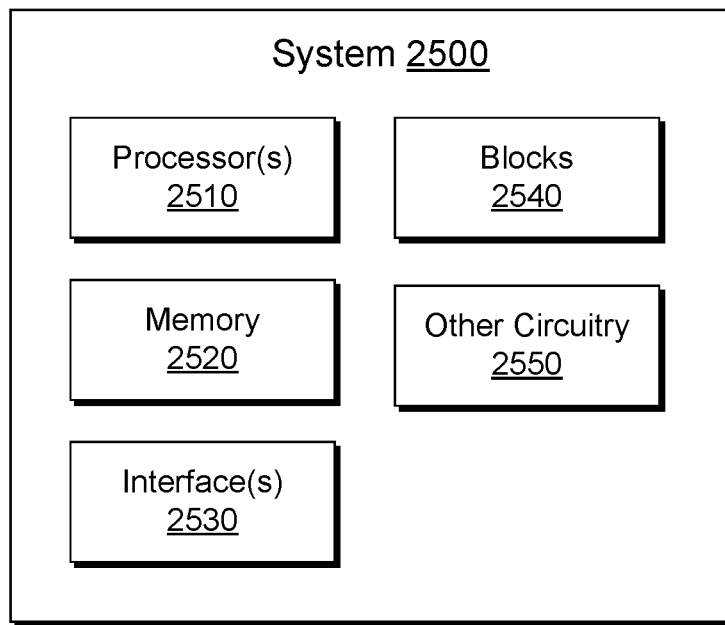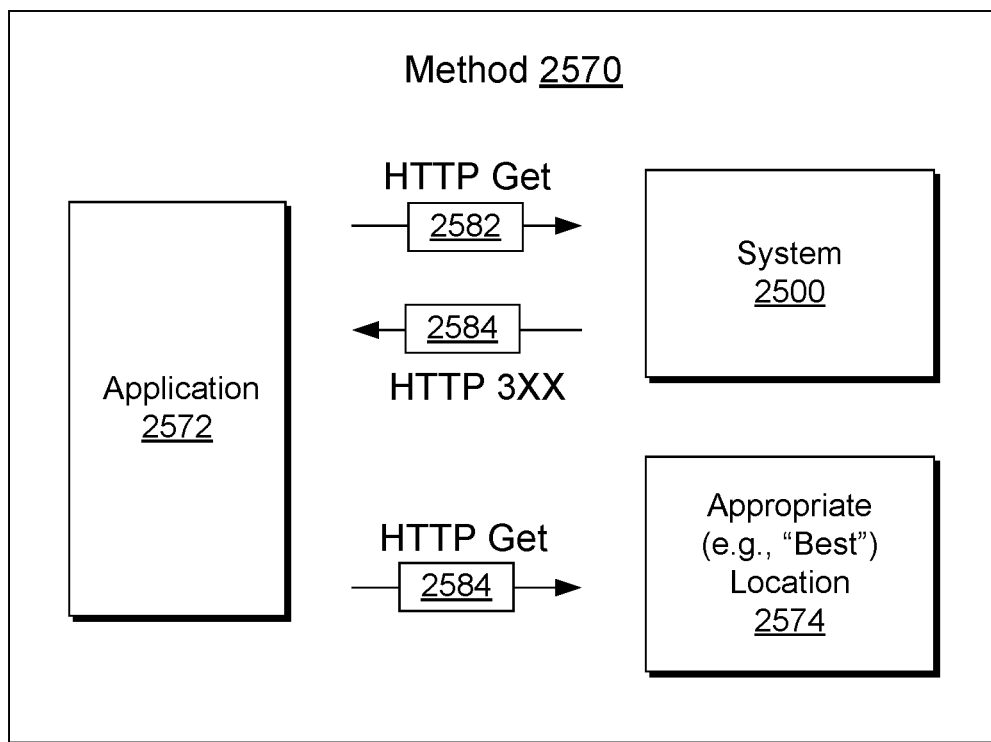
Fig. 25

REDIRECTION SERVICE

RELATED APPLICATIONS

This application is a continuation of a U.S. patent application having Ser. No. 14/485,783, filed 14 Sep. 2014 (issued as U.S. Pat. No. 9,276,994, 1 Mar. 2016), which is a continuation of a U.S. patent application having Ser. No. 13/340,480, filed 29 Dec. 2011 (issued as U.S. Pat. No. 8,838,767, 16 Sep. 2014), which is incorporated by reference herein and which claims the benefit of a U.S. Provisional Application having Ser. No. 61/428,491, filed Dec. 30, 2010, which is incorporated by reference herein.

TECHNICAL FIELD

Subject matter disclosed herein generally relates to technologies and techniques for redirecting services.

BACKGROUND

Redirection services are provided by, for example, the HTTP protocol, which finds use with the Internet and the World Wide Web (e.g., interlinked hypertext documents accessible via the Internet). The Internet is a global system of interconnected networks that link computers, computing equipment, storage, etc. The Internet is often referred to as "a network of networks".

For the Internet, resources (e.g., information, programs, etc.) are located using uniform resource locators or universal resource locator (URLs), a type of uniform resource identifier (URI). A URL includes, for example: a scheme name (e.g., HTTP), followed by a colon, two slashes, then, depending on scheme, a domain name (e.g., alternatively, an IP address), a port number, a path of a resource to be fetched or a program to be run, then, for example, for programs such as Common Gateway Interface (CGI) scripts, a query string, key-value string, etc., and an optional fragment identifier.

Communication over the Internet can occur via a standard Internet protocol suite such as the Transmission Control Protocol (TCP) and Internet Protocol (IP) suite. The TCP/IP Internet protocol suite classifies its methods and protocols into four hierarchical abstraction layers: the link layer, the Internet layer, the transport layer, and the application layer. Each layer has functionality that solves a set of problems within its particular scope.

HTTP is an application layer protocol within the TCP/IP suite. The protocol definitions presume a reliable transport layer protocol for host-to-host data transfer (e.g., TCP). HTTP has found application with other protocols, such as the User Datagram Protocol (UDP), for example, in methods such as the Simple Service Discovery Protocol (SSDP).

As to redirecting, using HTTP as an example, a redirect is a response with a status code beginning with 3 that induces a browser to go to another location, with annotation describing the reason, which allows for the correct subsequent action (such as changing links in the case of code 301, a permanent change of address). HTTP defines several status codes for redirection, including: 300 multiple choices (e.g., to offer different languages); 301 moved permanently; 302 found (e.g., optionally to specify redirection for a particular reason, which may be unspecified); 303 see other (e.g., for results of cgi-scripts); and 307 temporary redirect.

The foregoing status codes operate according to a redirect target in a location header of a HTTP response. Below is an example of an HTTP response that uses the status code 301 "moved permanently" redirect:

```
HTTP/1.1 301 Moved Permanently
Location: http://www.example.org/
Content-Type: text/html
Content-Length: 174
<html>
<head>
<title>Moved</title>
</head>
<body>
<h1>Moved</h1>
<p>This page has moved to <a
href="http://www.example.org/">http://www.example-
.org/</a>.</p>
</body>
</html>
```

A redirection service may be part of an information management system that provides an Internet link that redirects users to desired content. A redirect link may be used as a permanent address, for example, as to content that frequently changes hosts. As an example, the redirection service "bit.ly" shortens URLs through use of the bit.ly domain or other custom domains to generate shortened links. Redirection is achieved using an HTTP Redirect (e.g., URL forwarding from the short URL to the full URL).

Another feature specified in the HTTP is known as a "referrer". For example, when a webpage link is clicked by a user, a browser application issues a HTTP request that includes a referrer field that indicates the source of the link (e.g., the last page the user was on—the one where he/she clicked the link). More generally, a referrer is the URL of a previous item which led to the HTTP request being issued. The referrer for an image, for example, is generally the HTML page on which it is to be displayed. The referrer field is an optional part of the HTTP request sent by a browser application to a web server.

On the Internet, various server variables are available, which may be part of a request (e.g., Request.ServerVariables). A request may include one or more parameters that specify information (e.g., server_variable). As an example, a variable "REMOTE_ADDR" may be specified as a parameter for the IP address of a remote host making a request, noting that an IP address can assist in geolocation. As an example, consider a browser application running on a computer with a connection to the Internet and, thus, an IP address. A user, using the browser, can enter a domain name for a webpage such that the browser instructs the computer to send a request to retrieve the webpage. To allow a server hosting the webpage to respond to the request, the request typically includes the IP address of the sending computer (i.e., where the information should be sent).

Depending on configuration, a server may also respond by sending a cookie (e.g., which may be stored by the browser application). A cookie includes some information, which a browser application may instruct a computer to send upon a subsequent request.

While some examples mention "browser" or "browser application", any application that allows for access to the Internet (e.g., using the HTTP) may be configured to make a request. As an example of a type of application, consider the various iTunes apps that may be implemented on an iPhone device such that the iPhone device can send a request. An iTunes or other app may also include an ad (e.g., a banner, etc.) where activating the ad (e.g., clicking, tapping, etc., on a link graphic) causes the device running the app to send a request (e.g., an HTTP request).

With respect to connections to the Internet, a device may include circuitry to connect via wire, wirelessly or both via wire and wirelessly. As to wireless connection, a cellular or other network may be intermediate to the Internet (e.g., 3G, 4G, BLUETOOTH™, etc.).

On the World Wide Web, various entities exist in the realm of e-commerce. In a system known as affiliate marketing, a publisher can be any type of Web site, app, etc., for example, from a well-known destination that offers consumers a range of shopping opportunities to a blogger that's just beginning to attract an audience to an app developer. Regardless of the type, as a loyal following is built, opportunities exist via affiliate marketing to monetize the site, the app, etc. by earning commissions. In such a scheme, the publisher can become an affiliate of an affiliate program where the publisher can displays ads, text links, or product links (e.g., from an advertiser or other entity) in return for a commission when a sale is made or when a lead is acquired. A sale may be tied to a specific action such as filling out a form or downloading a trial.

One affiliate network is LinkShare, which manages various different affiliate programs. LinkShare facilitates relationships between publishers and advertisers by providing the underlying technology that manages links, tracks results and commissions, and sends payments.

An affiliate programs may operate as follows: a site owner (e.g., affiliate) offers goods or services of a merchant for sale on its site by including an "affiliate link" to direct a user to that merchant for a good, goods, a service, services, etc. When a user (e.g., a visitor) click on the affiliate link, an identification code is associated with the click (e.g., via a cookie) and in the event that the user takes an appropriate action (e.g., a visit, a conversion to a lead, a conversion to a sale) then the affiliate (i.e., the site owner) is paid by the merchant. The merchant or affiliate network will also usually provide tools for the affiliate to monitor various metrics, such as the number of visitors sent to a merchant site, the number of clicks or sales generated, and the earnings accumulated. Affiliate relationships may be established either with each merchant directly (e.g., Amazon.com), or through an established third-party affiliate network (e.g., LinkShare, TradeDoubler, Commission Junction, etc.).

As described herein, in various examples, a redirection service can, for example, enhance user experience on the World Wide Web, optionally with referrer information or affiliate information that may benefit parties involved in transactions for goods, services, etc.

BRIEF DESCRIPTION OF THE DRAWINGS

Features and advantages of the described implementations can be more readily understood by reference to the following description taken in conjunction with the accompanying drawings.

FIG. 3 is an example of a system that includes redirection services;

FIGS. 17 and 18 are an example of a method for redirection where a user's country matches the source country, and the country is affiliate supported;

FIGS. 19 and 20 are an example of a method for redirection where a user's country differs from the source country, and is affiliate supported;

FIG. 25 is an example of a system (e.g., a server or other computing device) and an example of a method that may transmit, receive, etc., data structures.

DETAILED DESCRIPTION

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

Figure 1:
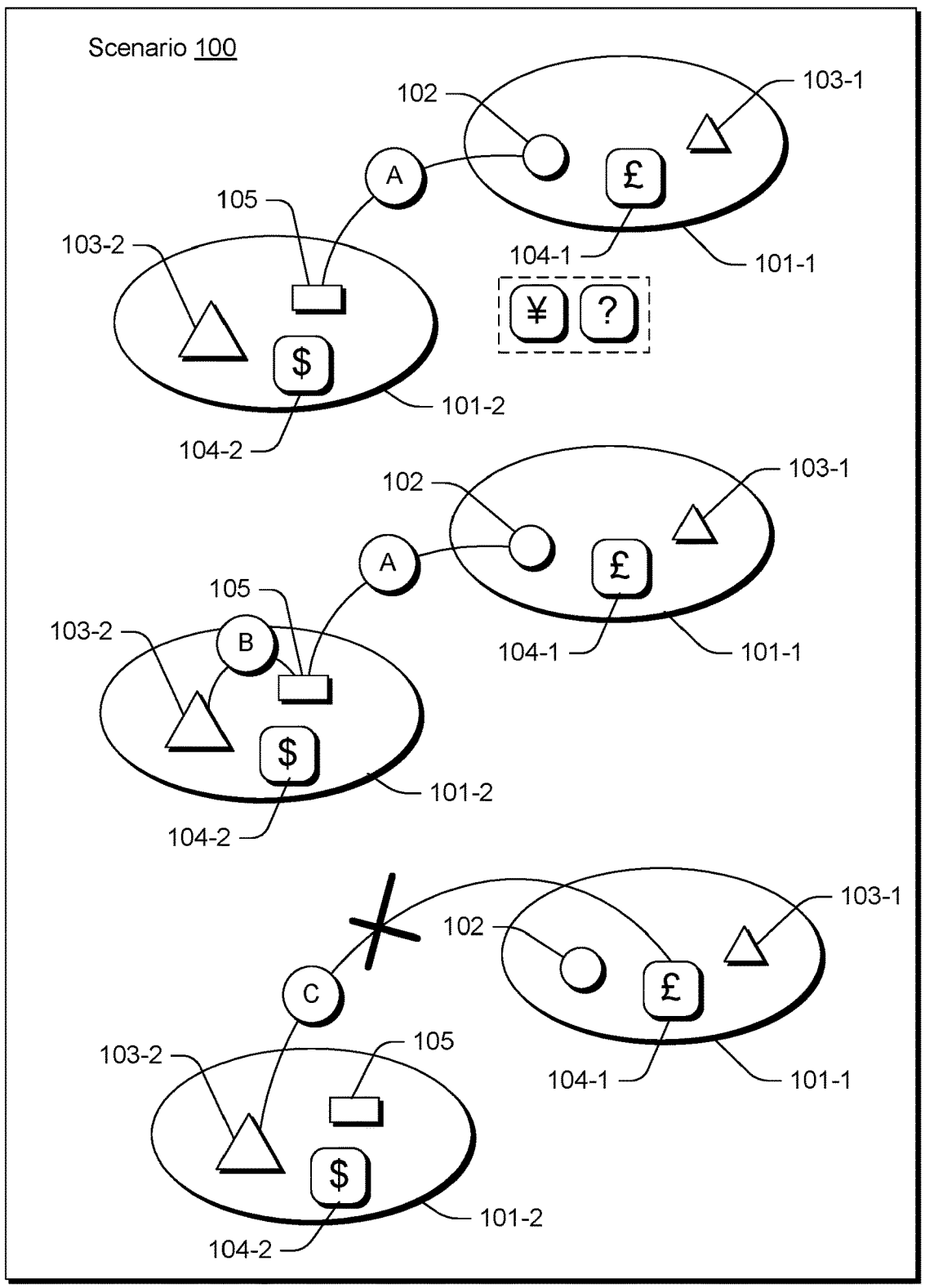
FIG. 1 is an example of a scenario for a user in a first region accessing a site in a second region.

FIG. 1 shows a scenario 100 that includes a first region 101-1 and a second region 101-2 where at least one difference exists between these two regions that may impact a transaction. A difference may exist as to currencies, taxes, intellectual property rights (IPRs), digital rights management (DRM), licensing, etc. In the example of FIG. 1, the difference pertains to currency in that the first region 101-1 uses, primarily, a currency that differs from the primary currency of the second region 101-2.

As to the region 101-1, it includes a user 102 using a browser application to access the Internet, an Internet store front 103-1 (e.g., for transactions involving goods or services) and a financial institution 104-1 (e.g., a bank, a credit union, etc.). The region 101-2 includes a website 105, an Internet store front 103-2 that has a relationship with the Internet store front 103-1 and a financial institution 104-2.

As shown in FIG. 1, the user 102 initiates a communication "A" with respect to the website 105. The communication "A" activates a link of the website 105 that causes issuance of a request "B" for a resource associated with the Internet store front 103-2. For example, the website 105 may be that of a recording artist where the website 105 provides one or more links for purchase of digital media from the Internet store front 103-2.

As shown in FIG. 1, where the user 102 initiates a financial transaction with the Internet store front 103-2 for purchase of a good, a service, etc., the transaction is forbidden because it violates one or more rules. For example, where the user 102 has an account with the financial institution 104-1 in region 101-1, the Internet store front 103-2 may not honor a transaction with that account "C" because it is in a foreign currency.

As mentioned, a reason or reasons for denial of a transaction may be based on a factor or factors other than currency. For example, where the Internet store front 103-2 provides goods, services, etc., based on a regional license that pertains to the region 101-2 only, it may be illegal for the Internet store front 103-2 to sell, provide, transmit, etc., the goods, services, etc., to one or more other regions. As another example, where taxes are to be applied by law, a system may not be in place to collect taxes or deliver tax payments. As yet another example, where the goods, services, etc., are restricted by law (e.g., technology, moral issues, etc.), the transaction may be denied.

Figure 2:
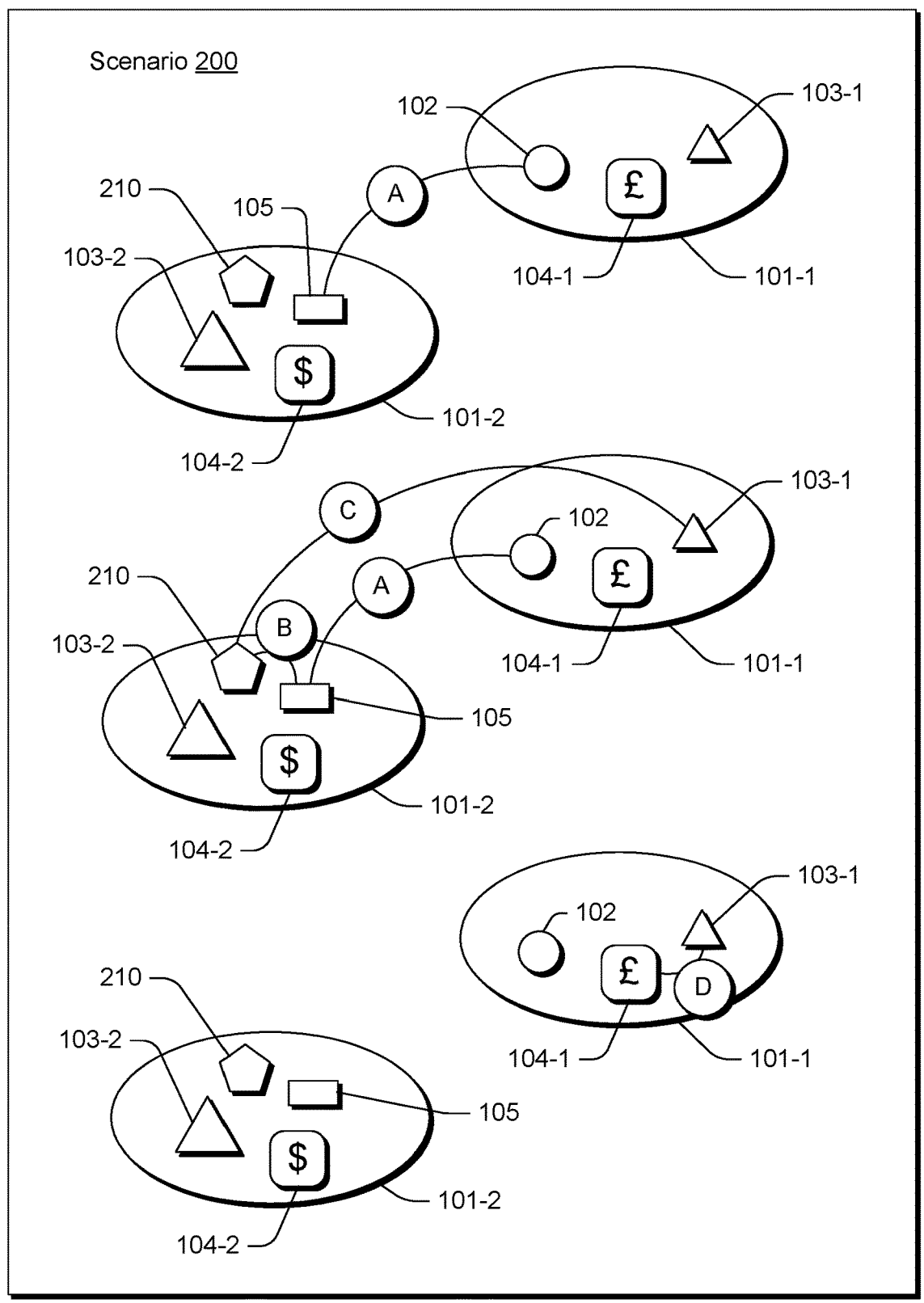
FIG. 2 is an example of a scenario for a user in a first region accessing a site in a second region with redirection.

FIG. 2 shows an example of a scenario 200, which includes the various components, actors, etc., of the scenario 100 and, additionally, a redirection service 210. The redirection service 210 may have a relationship with the website 105 such that a click on a link of the website 105 issues a request to the redirection service 210 rather than the Internet store front 103-2. In the example of FIG. 2, the redirection service 210 analyzes information associated with the communication "A" initiated by the user 102 in the region 101-1 to determine whether the communication "A" is coming from a region other than the region 101-2, which may have one or more conditions, restrictions, etc., with respect to the Internet store front 103-2, the region 101-2, etc. Such an analysis may be a geolocation analysis. For example, Internet geolocation may be performed by associating a geographic location with an IP address (e.g., associated with a machine used by a user). IP address geolocation data can include information such as country, region, city, postal/zip code, latitude, longitude and timezone. Deeper data sets may be available to determine other parameters such as domain name, connection speed, ISP, language, proxies, company name, US DMA/MSA, NAICS codes, and home/business.

In the example scenario 200, the redirection service 210 analyzes information, determines a geolocation of the communication "A" directed to the website 105 and then redirects the request "B" (e.g., activated by the communication "A") to the Internet store front 103-1, which is believed proper for users that reside in region 101-1 (see, e.g., FIG. 25 for an example of a redirect using a protocol such as the HTTP). As shown in FIG. 2, the Internet store front 103-1 can perform a financial transaction with the financial institution 104-1, for example, to complete a purchase by the user 102 for goods, services, etc. available from the Internet store front 103-1 in region 101-1, as advertised on the website 105 in region 101-2.

In various examples described herein, a user, such as the user 102, may operate a device that can access the Internet where the device includes an application (e.g., a web browser or other application) configured to present a user interface that allows the user to activate an Internet link (e.g., via touch, voice, shake, etc.). Where the device is a cell phone (e.g., or other device with cell network circuitry), such a link may occur indirectly (e.g., first via a cell network and then the Internet).

FIG. 3 shows an example system 300 that includes users 301, stores 303, sites 305 and a redirector 310 that provide redirection services to mediate requests issued by the sites 305 in response to links activated by users 301. The redirector 310 may be a server or servers and may be a network of equipment, optionally with equipment located in one or more regions.

In the example of FIG. 3, the redirector 310 includes various modules, which may be software, hardware, etc., provided locally, remotely, locally and remotely. A geolocator module 311 provides for geolocation of, for example, users 301. A rules module 312 provides for one or more rules for a region or regions (e.g., for IPRs, DRM, currencies, taxes, legalities, etc.). A commerce module 313 provides for any of a variety of actions with respect to commerce (e.g., e-commerce), which may include a per click, a per month, etc., type of service agreement. An affiliates module 314 provides for information as to one or more affiliates of, for example, one or more Internet store fronts. A search module 315 provides for search services with respect to information received via one or more sites as being related to a user communication and goods, services, etc., offered by one or more Internet store fronts.

In the example of FIG. 3, the redirector 310 is shown as being configured to service requests from the sites 305 (e.g., as initiated by an application running on a device with a network interface) and to redirect these requests to one or more Internet store fronts 303, which may match or mismatch (e.g., where country of origin matches or does not match).

FIG. 3 also shows various data handling schemes 320 performed by a redirector 310 with respect to information associated with a link in a site 305. As an example, a link of a site 305 may be specified according to the iTunes Store, for example, in the form of a lookup (LU) or a search via the iTunes Store Web Service Search API, which allows for placement of search fields in a link of a website, app, etc., to identify (e.g., lookup) or to search for content within an iTunes Store. For example, it is possible to identify an item using a unique identifier (e.g., an item ID). As another example, it is possible to search for a variety of iTunes Store content using one or more search terms where an item may be an app, an e-books, a movie, a podcast, music, a music video, an audiobook, a TV show, etc. A feature of an API may allow for calling an ID-based lookup request to create mappings between a content library and a digital catalog. Further, as to affiliates, an iTunes Affiliate Program allows affiliates to earn a commission on qualifying revenue generated by clicks initiated from an application (e.g., a web browser application that presents a website, a iPhone application that presents a user interface for activating an Internet link, etc.) into an iTunes Store. As described herein, "search" (e.g., including "searching") can include "lookup" (e.g., including "looking up"); thus, search or searching may include use of an item ID.

To search for content in an iTunes Store, a so-called fully-qualified URL content request can be made to an iTunes Store. In response, the iTunes Store may return a JavaScript Object Notation (JSON) format response. According to the iTunes Store API, a fully-qualified URL has the following format:

http://itunes.apple.com/search?parameterkeyvalue where "parameterkeyvalue" can be one or more parameter key and value pairs indicating the details of a query.

To construct a parameter key and value pair, concatenation is performed for each parameter key (e.g., data field) with an equal sign (=) and a value string. For example: key1=value1. To create a string of parameter key and value pairs via concatenation, an ampersand (&) is used (e.g., key1=value1&key2=value2). The resulting string may be referred to as a data structure.

For the iTunes Store, parameter keys include, as examples: term (e.g., URL-encoded text string to search for in an iTunes Store such as "jack+johnson"); country (e.g., a two-letter country code for an iTunes Store to search, where the default is the store front for the specified country); media (e.g., media type to search for in an iTunes Store such as "movie", where default is all); entity (e.g., type of results to return, relative to the specified media type such as "movieArtist" for a movie media type search, where the default is a track entity associated with the specified media type); attribute (e.g., attribute to search for in an iTunes Store, relative to the specified media type such as "entity=allArtist&attribute=allArtistTerm"); limit (e.g., number of search results to return); lang (e.g., language to use when returning search results such as "en_us"); and explicit (e.g., a flag indicating whether or not to include explicit content in search results).

The iTunes Store API also provides for receipt of lookup requests to search for content based on identifiers, including iTunes IDs and All Music Guide (AMG) IDs. ID-based lookups tend to be performed more quickly and to result in fewer false positive results. As an example, a fully-qualified URL for a specific iTunes Store lookup request by iTunes artist ID is as follows:

http://itunes.apple.com/search?id=909253

For a lookup of the artist Jack Johnson by AMG artist ID, a URL is:

http://itunes.apple.com/lookup?amgArtistId=468749

For multiple artists by their AMG artist IDs, a URL would look like the following:

http://itunes.apple.com/lookup?amgArtistId=468749, 5723

To look up all albums for Jack Johnson, a URL would look like the following:

http://itunes.apple.com/ lookup?id=909253&entity=album

To look up multiple artists by their AMG artist IDs and get each artist's top 5 songs, a URL would look like:

http://itunes.apple.com/lookup?amgArtistId=468749, 5723&entity=album&limit=5.

In the example of FIG. 3, the data handling schemes 320 include: a scheme 322 where metadata (e.g., an iTunes Store URL or other store directed URL) is received by the redirector 310 and passed to a store front 303 (e.g., as a redirect); a scheme 324 where the metadata is received by the redirector 310 and compared to an information cache 316 where metadata is returned to the redirector 310 and passed to a store front 303 (e.g., as a redirect); a scheme 326 where the metadata is received by the redirector 310 without an adequate response from an information cache 316 and thus submitted via an API 330 which returns metadata that is then passed to a store front 303 (e.g., as a redirect); and a scheme 328 where the metadata is received by the redirector 310 and submitted via an API 330 which returns metadata that is then passed to a store front 303 (e.g., as a redirect).

As an example, a process may include making multiple calls (e.g., to a cache, an API, etc.). Consider a first call that is a lookup to get metadata from a link followed by a second call that is a search that uses the retrieved metadata in an appropriate country.

According to the data handling schemes 320, the redirector 310 can operate to ensure that a redirect directs a user to appropriate content at a store front. As mentioned, in various examples, a redirect may occur according to a protocol such as the HTTP (see, e.g., the HTTP 3XX example of FIG. 25). Thus, in the data handling examples 322, 324, 326 and 328 of FIG. 3 (or other examples), additional lines, arrows may exist, as well as additional entities (e.g., an application that activates a link, one or more entities as occurring or used for Internet communications, etc.). In various examples, a line or lines may represent a logical flow (e.g., without specifics as to a particular protocol).

Figure 4:
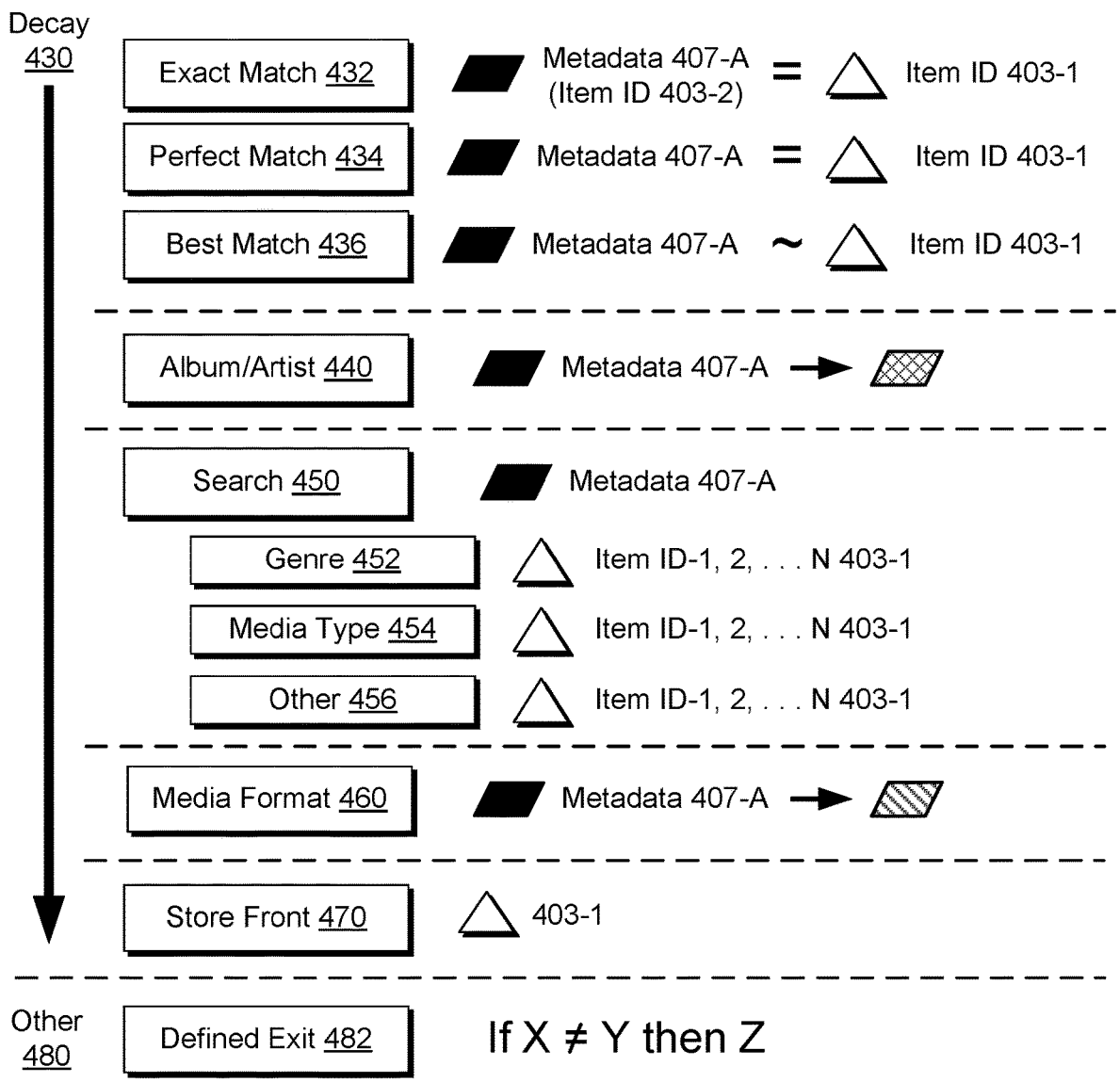
FIG. 4 is an example of a scenario and an example of a decay process.

As described with respect to FIG. 4, situations may arise where metadata, which may include one or more IDs, from a site do not exactly match that for a store front in another region where a user may be redirected. In other words, the metadata may be specific to an Internet store front in a region in which the site resides (e.g., where the IP address of the site indicates that the store resides) and not be particularly fit for locating a resource at one or more other Internet store fronts (e.g., associated with the store front) in other regions.

FIG. 4 shows an example of a scenario 400 where a user 402 in a region 401-1 actives a link of a site 405 for an item A, which has associated metadata 407-A. The user 402 may be operating an application such as a web browser or other application that may be configured for communication via a protocol such as the HTTP. As indicated, the link for item A can corresponds to an item ID of an Internet store front 403-2 in a region that differs from 401-1. In the example scenario 400, the item ID may be a numeric string (e.g., "47731"). As mentioned, for an iTunes Store, various types of IDs may be provided in a URL. Additionally, or alternatively, metadata may include one or more parameter values (e.g., term, country, media, entity, attribute, limit, lang, explicit, etc.).

For the scenario 400, where the user 402 cannot perform transactions with the Internet store front 403-2 (e.g., according to one or more rules), the redirector 410 may redirect the request, including its metadata 407-A (e.g., ID(s), parameter(s), etc.), to the Internet store front 403-1. As to identifying content (e.g., item A) at the Internet store front 403-1, various situations may arise, as explained with respect to a decay process 430, which may be hierarchical in its logical structure (e.g., optionally provided as a state machine). As an example, metadata may be translated based on best match logic to be relevant to another store.

The decay process 430 may proceed via one or more relational operations such as an exact match 432, a perfect match 434, a best match 436, an album/artist 440, a search 450, a media format 460, a store front 460, a user defined 482, etc. The decay process 430 may proceed via decisions that form a decision tree (e.g., or a state diagram), which may be tailored based on metadata provided by a link. For example, where metadata includes an item ID for an Internet store front in one region and, if an exact match does not exist for that item ID in an Internet store front in another region, the decay process 430 may proceed via a store front operation 470 that redirects a user to an Internet store front in the appropriate region.

While particular hierarchy of decay logic is described in the example of FIG. 4, decay logic may be configured to account for various factors (e.g., based on learning, redirection service options, etc.). Further, while the example is described with respect to certain goods (e.g., digital music), a hierarchy and decay process may be tailored with respect to the goods, services, etc. (e.g., for applications, appliances, tools, etc.). Thus, categories such as "album" or "artist" may be, for example, "application suite" or "developer".

The decay process 430 may include caching information and optionally learning via a learning algorithm. For example, the data handling schemes 324 and 326 may include caching in the cache 316 as well as learning to manage cached information to expedite redirects and to enhance user experience (e.g., to redirect a user to content that is exact or deemed acceptably relevant to desired content). Such an approach may include determining whether a user navigates away from a store front or otherwise interacts with the store front in a manner that indicates that a redirect may not have been optimal (e.g., optionally including analysis of times, comparisons with other shoppers, etc.). For example, where a user wants to purchase a song (e.g., mp3 or other format file), if the redirect delivers the user to the song but recorded by a different artist, the user is likely to interact with the store front until she finds the correct song, if available.

In the example of FIG. 4, the exact match 432 may correspond to situations where an ID is exactly the same across associated store fronts in different regions; the perfect match 434 may correspond to situations where all metadata lines up perfectly across associated store fronts; and the best match 436 may correspond to situations where metadata overlaps to at least a certain extent (e.g., processing to remove brackets, parenthesis, etc., for live versions, deluxe versions of an album, media type is the same, etc.).

In the example of FIG. 4, the album/artist 440 operation may correspond to situations where a match cannot be made at the highest level and thus a match is made at the next highest level and so on (e.g., cannot find a match of a song so redirect a track link to land on an album page, a bonus song only available on an album that is available in a specific country, cannot be found at the highest and next highest level then descend to another level such as artist, etc.). While various examples pertain to songs, various approaches may apply to other digital media including, for example, applications. As to applications, metadata may include categories, application developer, etc. Further, decay may apply to any of a variety of goods, services, etc. For example, an on-line retailer may provide white goods, small appliances, tools, etc. As an example, consider a tool that performs a specific function (e.g., a hex wrench of a certain size). A decay process may search for tools that can perform the same function (e.g., hex wrench size), optionally within sets of tools (e.g., a wrench set), materials of construction, handle size, etc.

In the example of FIG. 4, the decay process 430 may include the search operation 450. For example, if a match is not possible for a song at an album level or an artist level due to too much noise or false positives then the search operation 450 may be initiated, for example, with one or more terms parsed from a URL, the site where the URL exists, etc., to assist a user in finding what he desires. For the search operation 450, such a search may be initiated using an API or other features associated with one or more store fronts or other databases (e.g., AMG database, etc.). As an example, a decay process may perform a search that formulates a URL link to drop a user at a results page of a search performed using at least some metadata. Further, results from the search operation 450 may be analyzed as to relevance, number, etc., and a decision made as to whether such results should be communicated to a user, for example, via a redirect to a page at the originating site or via a redirect to a page at a store front site or via a redirect to a page at a database site (e.g., AMG database, etc.). Where search results are deemed as being less than optimal, detracting from user intent, etc., the decay process 430 may proceed to another operation.

As shown in FIG. 4, the search operation 450 may include a search by genre operation 452 (e.g., user is dropped in a genre listings page for the same genre that the original item came from such as in response to no match for the band U2 and the song "With Or Without You", so drop to a "rock" genre page); a search by media type operation 454 (e.g., user is dropped at the front door of the store for the same media type such as in response to cannot determine genre of the U2 song "With Or Without You", so drop at the store front).

As to the media format operation 460, the decay process 430 may include an option such that at any point in decay a logical flag may be inserted to allow for the addition of other media formats (e.g., media types) to be included (e.g., to expand a search, number of results, etc.). For example, where an original link is for a digital music download on Amazon.com but at a certain level (e.g., a definable level in the decay process), expanded media options may become available so that a search can start searching for CDs or digital download music videos. As to media formats, such formats may include categories: ebook (audiobook, paperback, hardcover, Kindle book); mp3 track (CD, music video); VOD TV Show (DVD, VOD Movie. VOD Rental), etc. The redirection service may optionally provide standard, customizable, etc., options for a client or clients (e.g., site owners, etc.). Such options may include learning that aims to provide an optimal user experience, commercial benefit, etc.

As mentioned, the decay process 430 may perform a store front operation 470, to redirect to an entry page (e.g., home page) for a store front. Such an operation may be a default operation, for example, where a link is malformed upon receipt by a redirection service, where a link cannot be properly parsed to initiation a process, where an error is thrown due to a problem with a link, etc.

The defined exit operation 482 is an example of another type of operation 480, which may or may not be part of the decay process 430. Such an exit may optionally be defined by a client of a redirection service (e.g., owner of a site), for example, to define an error page that a user would be redirected to at any point in a decay process by flagging where the decay should stop. As an example, a default may be to never show a client's error page and allow the decay to go all the way to the store front. Consider a situation where a client only wants song tracks returned to users, i.e., the client never wants their users to be dropped to an album or lower. In such a situation, the client could define an exit operation to stop the decay process after the best match operation 436 (e.g., to redirect a user to an error page instead of decaying further).

In various examples described herein, a redirector may be a computer or computing system (e.g., a server) that includes an interface that receives a URL responsive to a user activating an Internet link via an application (e.g., a browser application, an application that presents a user interface for activating an Internet link, etc.) where the URL comprises metadata for an item specified by a country-based Internet store; circuitry that identifies a base country of the user by resolving an Internet Protocol address associated with the user (e.g., according to a device running the application, etc.); circuitry that decides if the base country of the user differs from the country of the country-based Internet store; and circuitry that formulates, if the base country differs, a URL for redirecting the user to a country-based Internet store for a country that corresponds to the base country of the user. As an example, the interface may be a network interface operable according to one or more standards associated with the Internet. As an example, the circuitry that identifies may include hardware, software, etc., that resolves an IP address to identify a region. As an example, the circuitry that decides may include hardware, software, etc., that compares a code resolved from an IP address to a code associated with the country-based Internet store. As an example, the circuitry that formulates may include hardware, software, etc., that formulates a URL using memory and a processor, which may access information stored locally, remotely, or locally and remotely. As to the URL, it may provide for directly redirecting or indirectly redirecting (e.g., first redirecting to an affiliate).

As described herein, a computing system may include circuitry that determines whether an item specified by a country-based Internet store matches an item specified by a country-based Internet store for a country that corresponds to a base country of a user. In such an example, circuitry may parse URL metadata to issue a query to a database, issue a call specified by an application programming interface of the country-based Internet store, etc.

As described herein, a computing system may include circuitry that determines a best match for an item for a country-based Internet store for a country that corresponds to a base country of a user. Such a system may include circuitry that formulates a URL based at least in part on the best match, circuitry that parses the metadata for search terms, circuitry that issues a search to a database using at least one search term, etc.

As described herein, a computing system can include circuitry that formulates a URL that includes information for an affiliate of a country-based Internet store for a country that corresponds to a base country of a user (e.g., an affiliate identification code), circuitry that formulates a URL that redirects a user to a website of an affiliate of a country-based Internet store for a country that corresponds to a base country of the user, etc.

As described herein, a method can include receiving a URL responsive to a user activating a link via an application (e.g., where the application may be a browser or other application) where the URL includes metadata for an item specified by a country-based Internet store; identifying a base country of the user by resolving the user's Internet Protocol address; deciding if the base country of the user differs from the country of the country-based Internet store; if the base country differs, formulating a URL for redirecting the user to an affiliate website where the URL includes information for a country-based Internet store for a country that corresponds to the base country of the user; and, if the base country does not differ, formulating a URL for redirecting the user to an affiliate website where the URL includes information for the country-based Internet store. In such an example, the affiliate may be an internal affiliate or an external affiliate.

As described herein, a method can include determining whether an item specified by a country-based Internet store (e.g., according to an ID, descriptive data, etc.) matches an item specified by the country-based Internet store for a country that corresponds to a base country of a user (e.g., as specified by a code or resolved using an IP address). In such a method, if the item does not match, the method may include implementing a hierarchical decay process (see, e.g., example of FIG. 4) and formulating a URL for redirecting the user to an appropriate Internet store (e.g., or an affiliate website) based at least in part on the hierarchical decay process (e.g., results of a decay process, whether logical or informational).

In various examples described herein, various terms may be used such as: Publisher (e.g., a website owner, an application developer, a client of a redirection service, etc.); Affiliate (e.g., a Publisher, a website owner, a client of redirection service that is also a member of an affiliate network/program such as LinkShare, TradeDoubler, etc.); User (e.g., a person that activates, e.g., "clicks on", a link on a site, an app, etc., where that site, app, etc., may be at least a client of a redirection service); Link on a Site or App (e.g., a link that redirects a user to a redirection service such that the redirection service can perform various acts); Redirection Service (e.g., a service that has, for example, publishers as clients and that can redirect users, as appropriate, for example, either directly to an appropriate Internet store or to an affiliate program site, which, in turn, redirects the user to an appropriate Internet store as determined by the redirection service); Advertiser (e.g., iTunes, Amazon.com, someone selling something via an affiliate program, etc.); Affiliate Network (e.g., LinkShare, TradeDoubler, an aggregator of advertisers and publishers, etc.).

FIGS. 5 to 16 pertain to examples of redirection services associated with affiliates. As an example, a redirection service may allow multiple geographically segmented affiliate programs to be used simultaneously through the use of a single URL on a website or from within an application (e.g., an iPhone application or other application). In such an example, the approach can involve detecting a user's IP address through a link and determining the user's geographic location. The original URL may then be translated from a source country to a URL specific to a country that matches the user's location. Further, a new URL may be encoded with a geographically correct Affiliate network's tracking information and the user redirected to this URL. As an end result, the user reaches the appropriate destination in the geographically correct online store front with proper affiliate tracking information in place.

Traditionally, an affiliate program for an international brand is actually a series of separate affiliate programs, each for a specific geographically segmented online store front. These affiliate programs are typically administered through separate Affiliate Networks (the companies that aggregate affiliate Publishers and Advertisers, provide account management, tracking and payout) as Affiliate Networks tend to also be geographically segmented. They also tend to be clustered around certain regions or continents if multinational.

Affiliate Networks tend to offer affiliate services in a single geographic location. In comparison, many Internet based retailers (Advertisers) have a world-wide following, which is also true for many popular content type websites or applications (Publishers). This creates a problem for affiliate Publishers as they are restricted into making commissions only on the sales they generate within one geographic region and do not tend to capitalize on the sales from other online store fronts. Generally, Publishers will use only one affiliate program: the one that is associated with the store in the country where the largest amount of their traffic originates.

As described herein, for purposes of e-commerce, a redirection service may provide geolocation services and affiliate marketing services. As an example embodiment, consider a Publisher A that owns a website that is content based (for example, a blog). In order to monetize his traffic, he has affiliate links on his website to an online retailer's store front that sells products relevant to his website content.

When clicked, these affiliate links direct his traffic to a specific item in the pre-specified online store front where purchases are made. The affiliate link contains specialized affiliate tracking information allowing sales inside the Advertiser's store front that originate from the Publisher's website or application to be deemed affiliated. The Advertiser, through the Affiliate Network, then provides a commission to Publisher A for referring that sale to the Advertiser. When Publisher A uses the standard affiliate links provided by a single Affiliate Network, he only generates a commission on sales in a specific online store front and does not receive a commission on sales made in international online store fronts by the same Advertiser. Using standard affiliate links also has the potential to direct his traffic to the wrong online store (wrong geographic location) where the traffic might not be allowed or able to purchase the intended goods. One example is if the traffic may need to have a bank account or credit card from the same region to purchase from the online store front or if the shipping costs would be too high due to international transfer. The traffic may also receive an error when following a standard affiliate link as their settings for their default store front will conflict with the store front to which the traffic is directed.

Using a redirection service, the Publisher's specialized affiliate links would first send traffic to the Service Provider where the traffic's proper country is determined systematically. The traffic is then dynamically built a new, custom URL that is specific to the geographically-appropriate target online store front. The traffic is redirected through the proper Affiliate Network (as determined from the user's geographic location) to the correct store. This keeps the user from receiving an error, allows the traffic to land on the most relevant page for the link they clicked and provides the ability to purchase the intended item(s). This also ensures the Publisher has the potential of receiving commissions from the affiliate program for that country's specific store.

As described herein, a redirection service may provide for allowing multiple geographically segmented affiliate programs to be used simultaneously through the use of a single URL on a website (e.g., accessed via a web browser application) or from within an application (e.g., an iPad application, an iPhone application, etc.). As an example, a process can use logic to determine the geographic location of the user and then translate and encode a URL into a geographically relevant affiliate link which includes the affiliate tracking information and directs the user into the appropriate store front based on location.

In various examples described herein, a redirection service may allow Publishers to utilize more than one geographically segmented affiliate program through multiple Affiliate Networks to capitalize on international Internet traffic.

Figure 5:
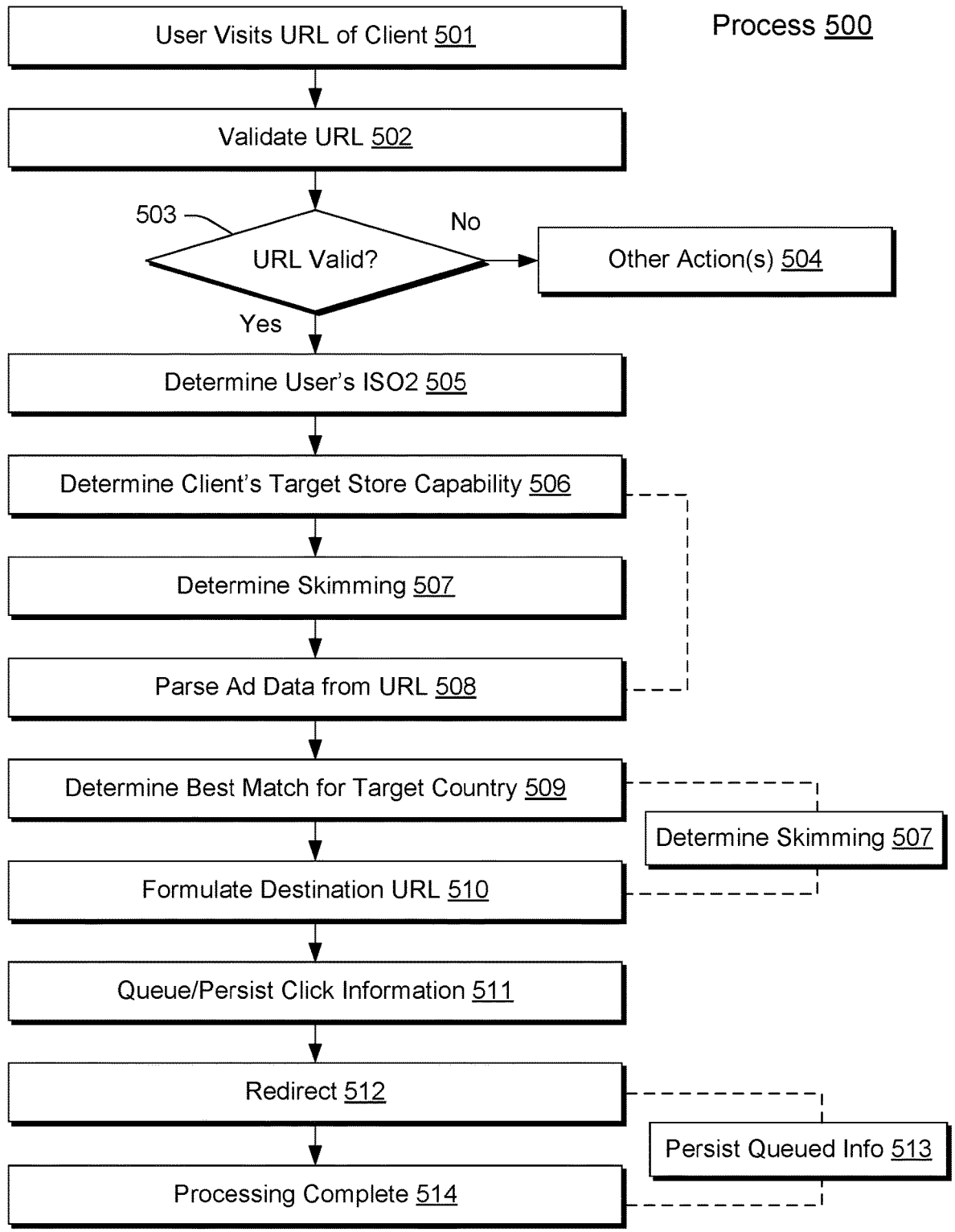
FIG. 5 is an example of an overview of a process (e.g., from navigating a user from clicking a link to arriving at specific online store front)

FIG. 5 demonstrates an example of an overall process 500 that happens when clicking on a link 501. The process 500 starts with a link (e.g., URL) on the Publisher's site or application being clicked by a user and finishes with a final redirection 512 with the user ending up at the most relevant page in the appropriate store front. Once the process 500 starts and the user clicks on that link 501, the URL Validation process takes place 502 which is explained further in FIG. 6.

Figure 6:
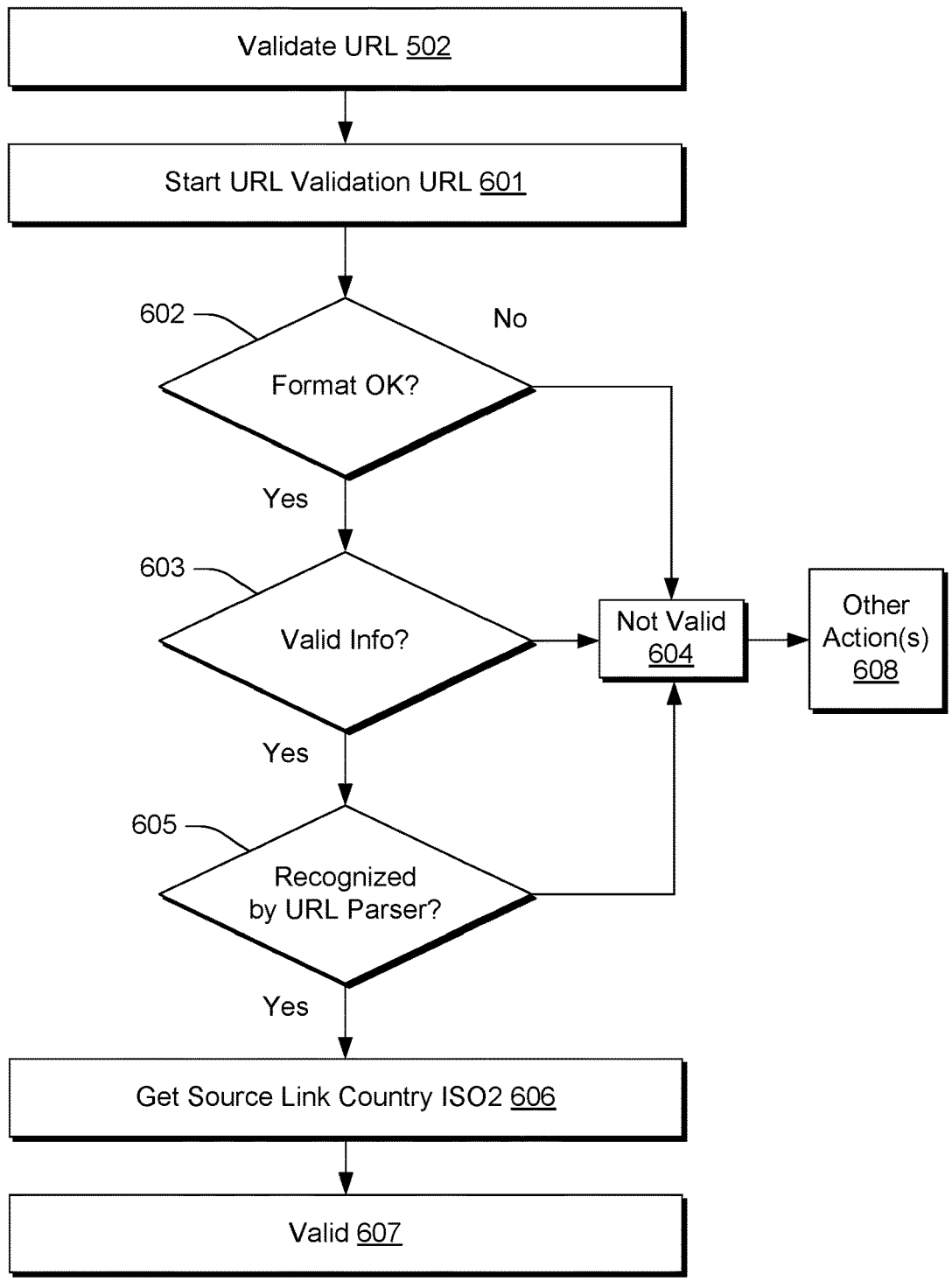
FIG. 6 is an example of a flowchart of the URL validation process shown in FIG. 5.

If the URL is determined to be invalid following the process 600 in FIG. 6, then, per a decision block 503, one or more other actions may occur, as indicated by another action(s) block 504. The block 504 may, for example, take the original URL that was passed in and pass the user on to it or drop the user at the store front. As another example, the user may be dropped at a client defined error page (e.g., as if a decay process hits a maximum allowed level of decay). However, if the link is determined to be valid, per the decision block 503, it will then go through a process to determine the user's International Standards Organization 2 letter geographical country code, or ISO2 for short 505. The ISO2 determination process is further explained in FIG. 7 but is used to determine the correct geographic store front for the user. ISO2 country codes are the standard for identifying the different countries throughout the world.

Figure 8:
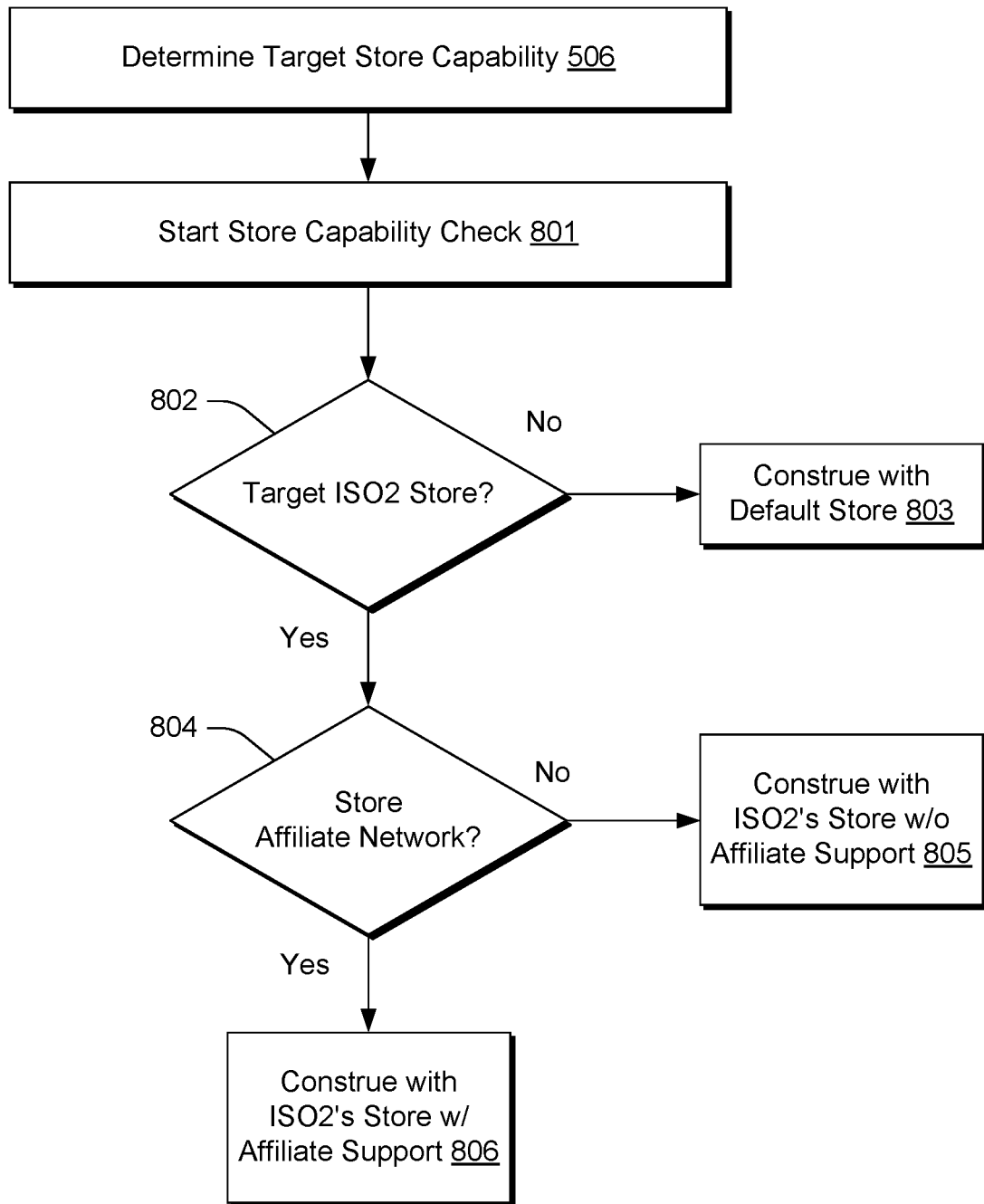
FIG. 8 is an example of a flowchart of the target store determination process shown in FIG. 5.

Once the user's ISO2 Country Code is determined, the next step in the process 500 is to determine if the item the original link pointed to is available in the user's appropriate store front 506. This procedure defines if there is a store front available in that particular geographic location that best matches with the user's country as shown in FIG. 8.

As an example, a check may be performed to determine if the exact same item is available in a store in the geographic location (e.g., correct country store). If so, the process can continue; whereas, if not, a lookup may be performed to get item metadata and then at least some of that metadata used to find a best match in the appropriate country store.

Figure 9:
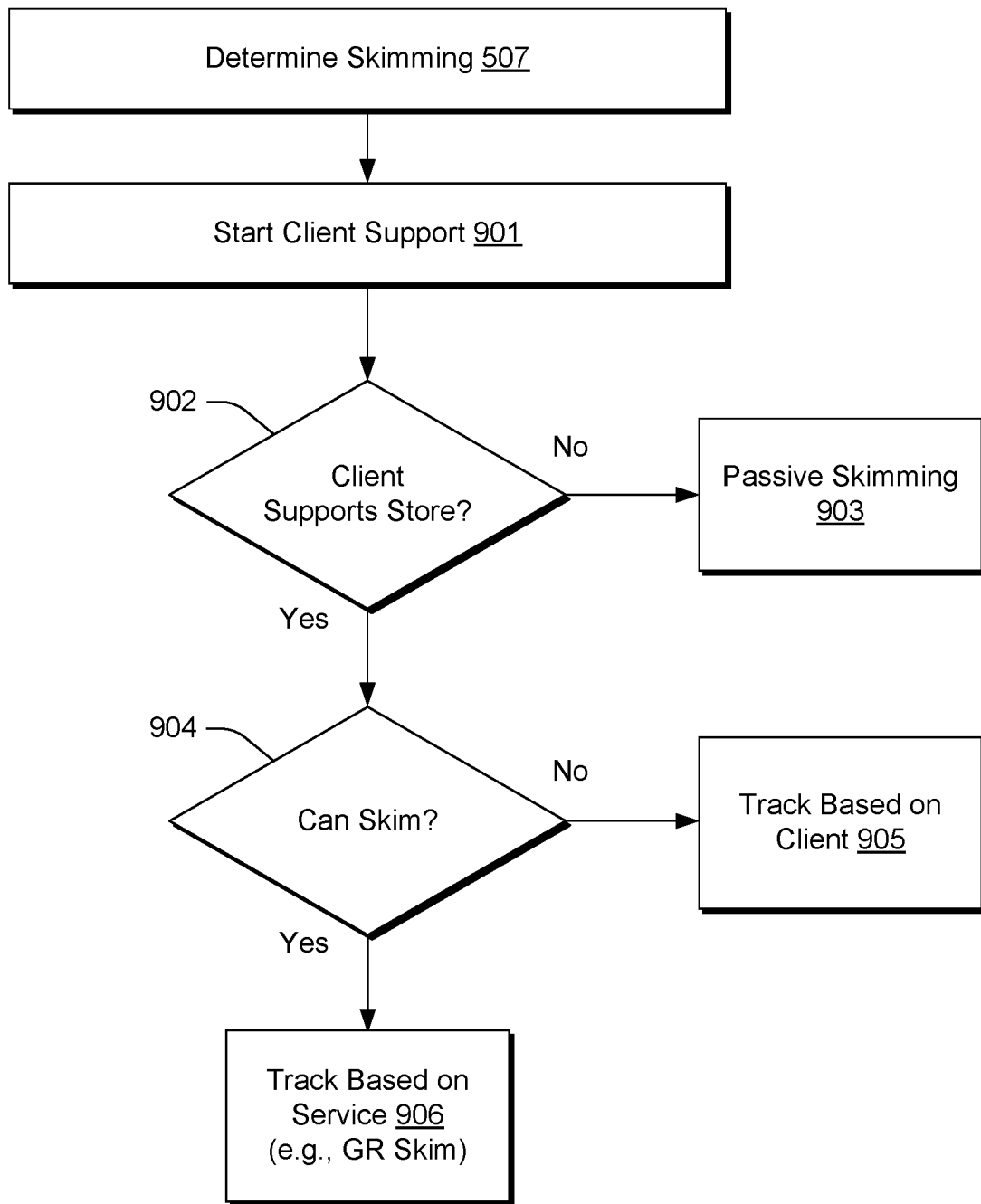
FIG. 9 is an example of a flowchart of the Skimming process shown in FIG. 5.

Once the target online store front has been resolved, the next sub-process may be to figure out if the provider of this service can "skim," which is the transparent process of rerouting a click with an affiliate code specific to the Service Providers, instead of the Publishers (see determine skimming block 507, which may optionally be located elsewhere in the process 500). This is an example of a revenue model the Service Provider may use to be compensated for providing the Publisher with the service; other models could be pay per click, monthly charge, etc. An example of a Skimming process is shown in FIG. 9.

Figure 10:
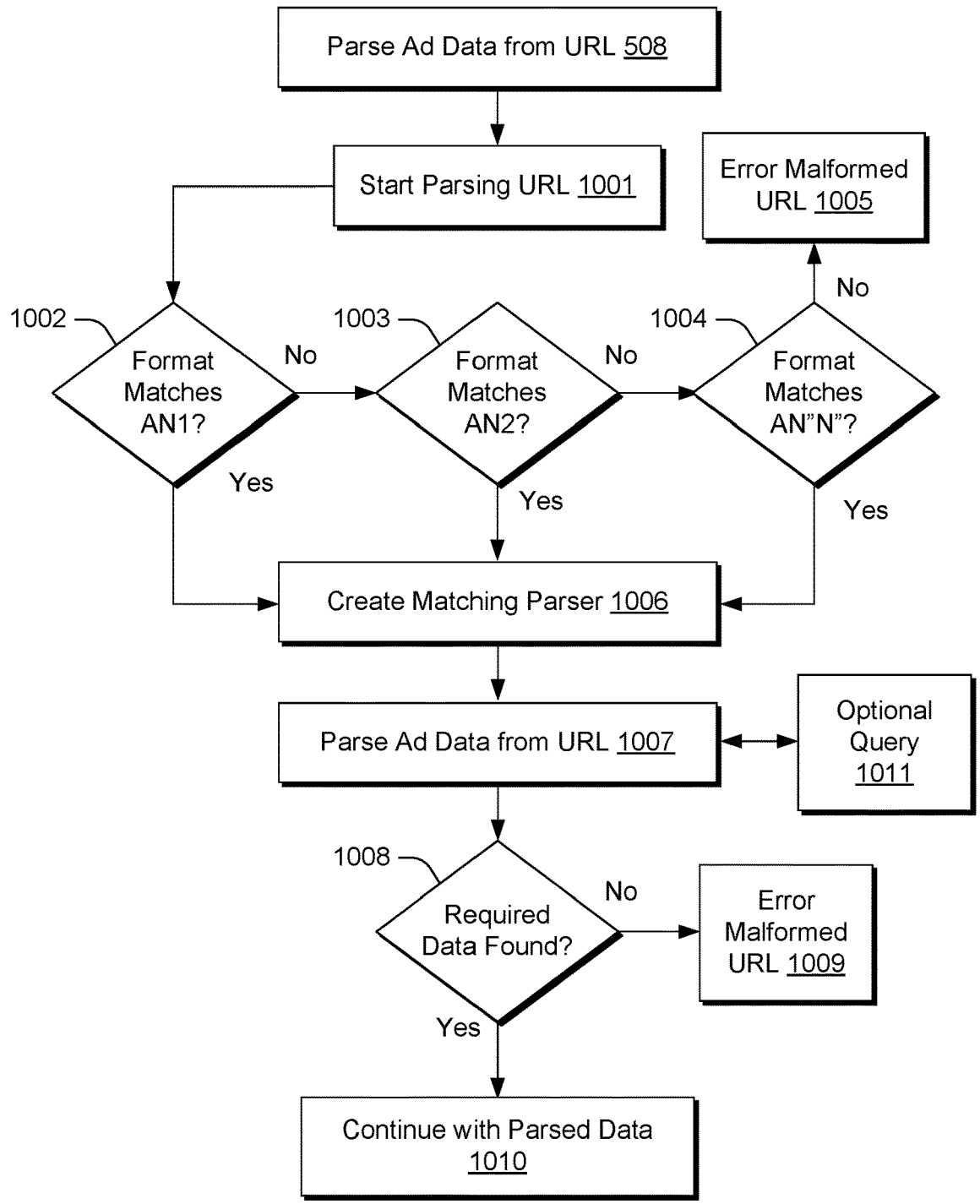
FIG. 10 is an example of a flowchart of the Advertiser data parsing process shown in FIG. 5.

After the skimming determination process, the original deep link (e.g., landing page URL, search link, item link, category link, etc.) is analyzed in order to parse the Advertiser's data 508. This involves breaking down the link to determine what data is contained in the link. A process 1000 shown in FIG. 10 illustrates data parsing in more detail.

Figure 11:
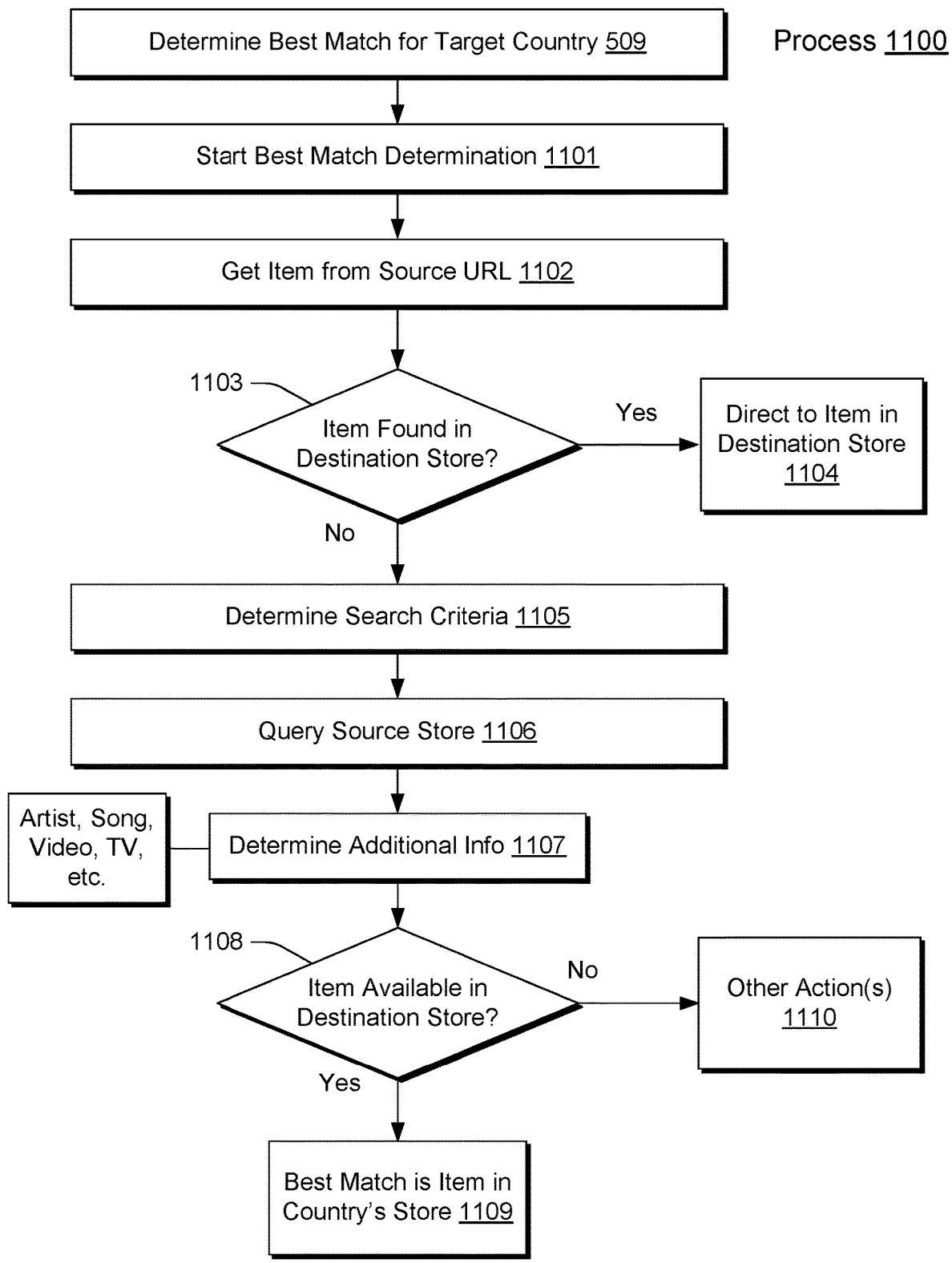
FIG. 11 is an example of a flowchart of the target country/store determination process shown in FIG. 5.

If at this point the data is parsed correctly, the service will start the procedure to determine the best matching item for the target country's store front (which was determined by the user's ISO2) 509. The service determines if the specific item mentioned in the original URL can be found and, if so, uses relevant metadata for that item to find a similar item in the geographically correct online store front. FIG. 11 shows an example of this process in more detail.

Figure 12:
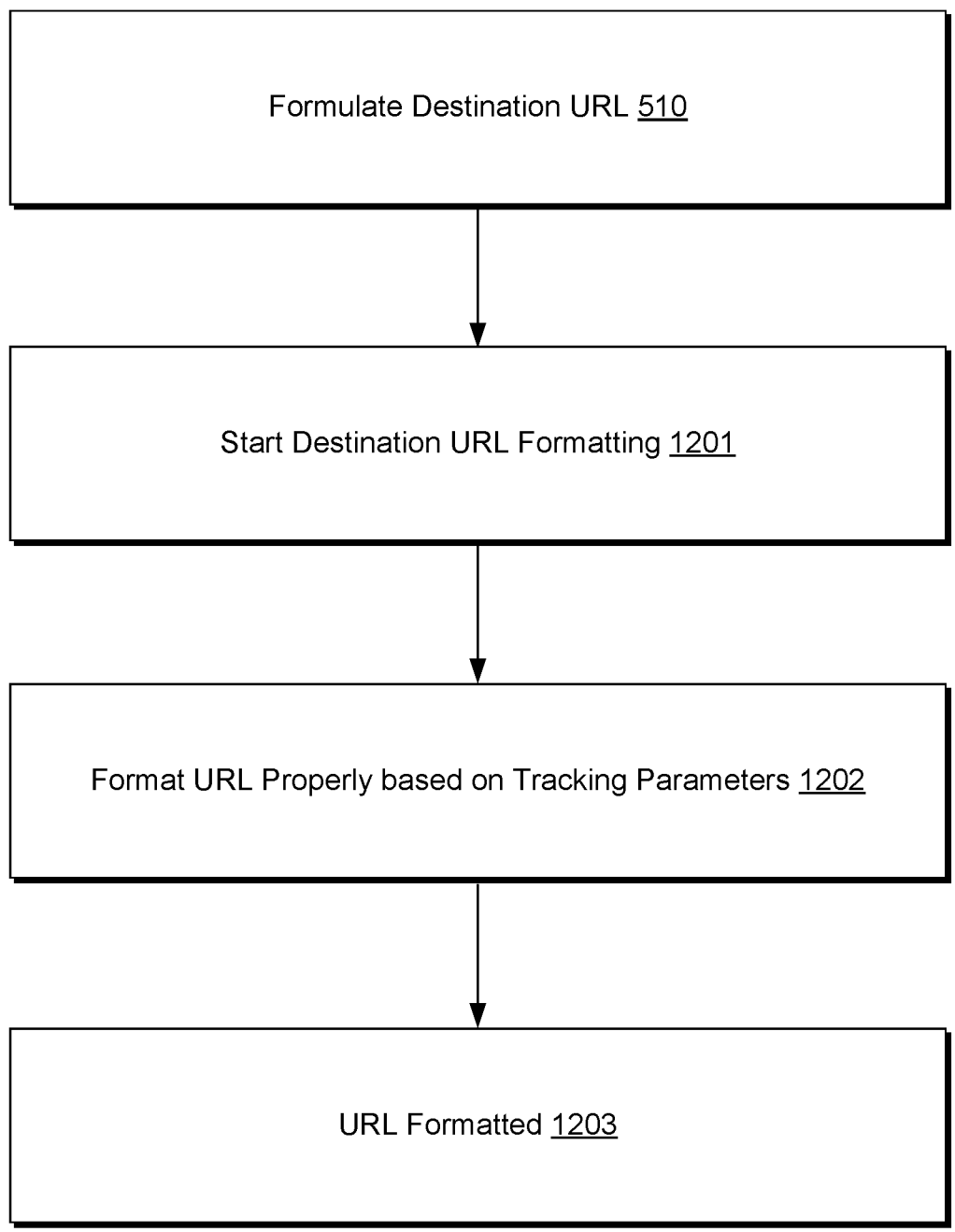
FIG. 12 is an example of a flowchart of the destination URL formatting process shown in FIG. 5.

If the requested digital good, hard good, service, etc., is available in the user's location the next step is to formulate the original deep link (e.g., landing page URL, search link, item link, category link, etc.) into a link that includes all of the updated information for that user's geographical location (e.g., store front, item number, etc.) 510. The Publisher's relevant affiliate tracking information is also applied at this step (or Service Provider's if being skimmed) to ensure the sale is affiliated. FIG. 12 shows an example of a formatting process 1200 (e.g., to properly formulate and format a URL).

Figure 13:
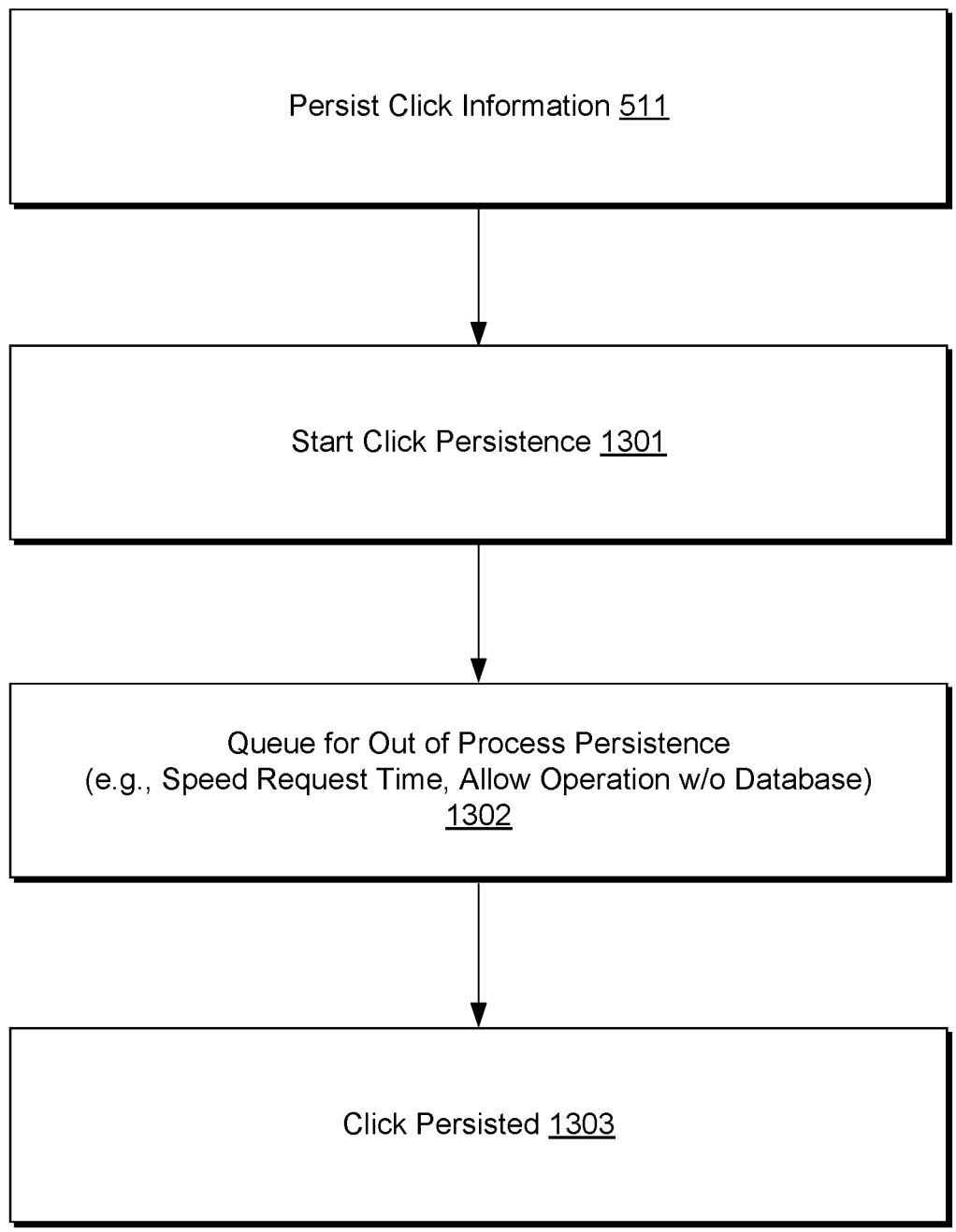
FIG. 13 is an example of a flowchart of the click information persisting process shown in FIG. 5.

Information pertaining to the click, including the user's ISO2, referring URL, date stamp, source country and destination country may be persisted (e.g., recorded) per a persist block 511. As an example, various types of information may be persisted, for example, for purposes of report generation, etc. As indicated by an optional persist queued information block 513, clicks may be queued in memory by the persist block 511, for example, to a certain number or after a certain time to be written to a database (e.g., instead of writing this information to the database after every click). Such an approach allows for speed optimization. FIG. 13 shows an example of a process 1300 in more detail.

For the process 500, a user is redirected to a new link that has been appropriately formulated and formatted 512. Once redirected, the user arrives at an appropriate online store front while affiliate tracking information is preserved and applied. As an example, such a process may occur where the store front is an Amazon.com store; noting that for other stores, a user may be redirected via an affiliate network (e.g., an affiliate network of an iTunes store).

Figure 14:
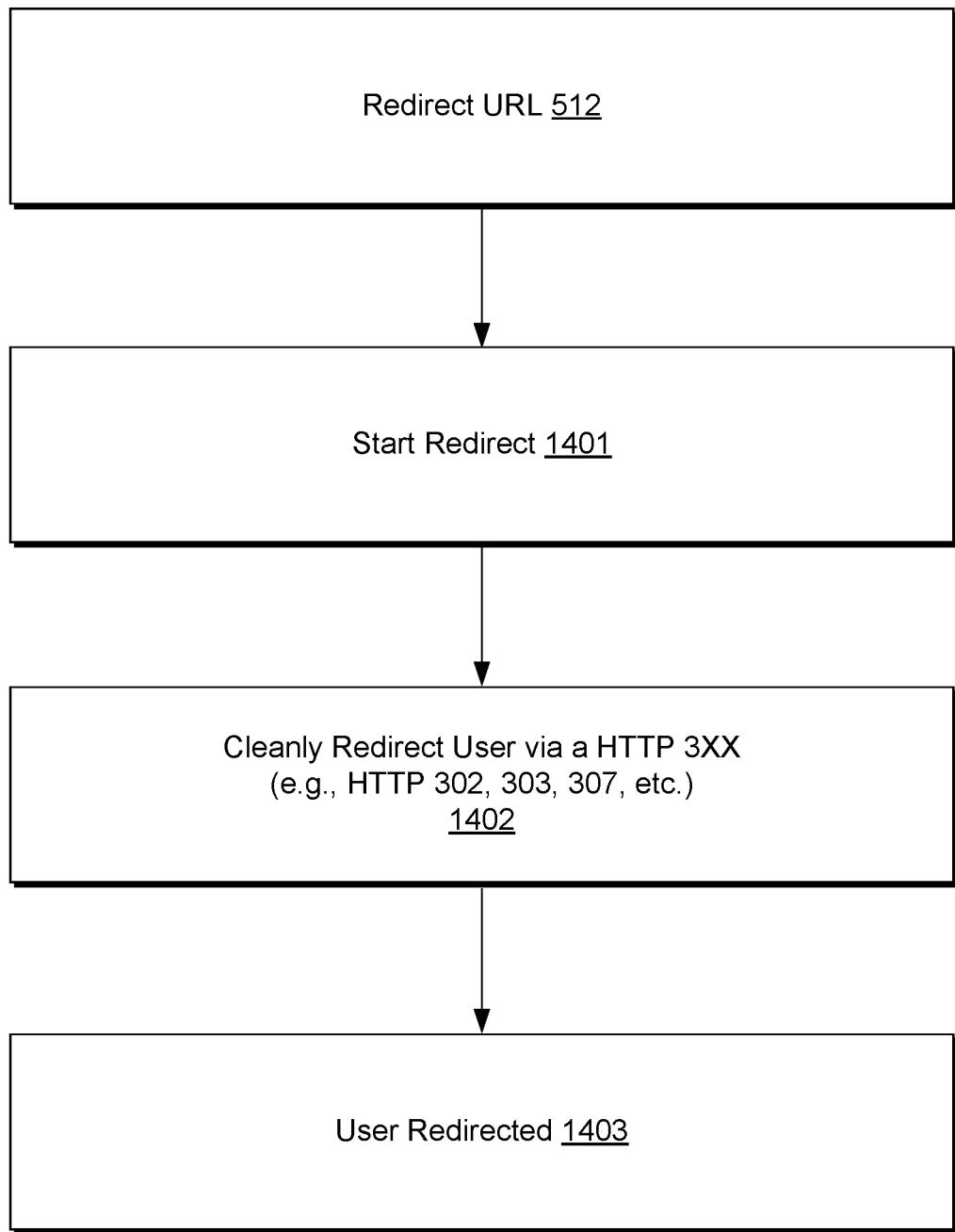
FIG. 14 is an example of a flowchart of the URL redirection process shown in FIG. 5.

The process 500 may be hidden from a user, i.e., the user has no indication that one or more redirects have occurred (e.g., to a redirection service and then to a store front other than the one associated with a link on a site). The process 500 can be traceable for the Publisher and Advertiser such that the Publisher gets credit and such that the Advertiser can track a sale. FIG. 14 shows an example of a redirection process 1400. In the end the user will arrive at an online store front on the page, preferably with the item most relevant to the referenced item in the original link. As shown in FIG. 5, for a redirection service, after processing of the click, the process 500 may be complete (see completion block 514).

FIG. 6 shows the process 600, as corresponding to block 502 of FIG. 5. The first step after a user clicks an affiliate deep link is the Service Provider validates the URL 601. The URL validation process includes making sure the original URL clicked by the user includes the necessary information in order for the user to get to his desired destination. The first step of the validation is to make sure that URL has the correct general format 602. If the format is considered not valid (e.g., missing information, incomplete URL, etc.) then the process is halted and determined Not Valid 604, which may continue to another action(s) block 608 (see, e.g., block 504 of FIG. 5).

If, however, the general format appears to be correct, the next step is to validate, for example, that the Service Provider's identification information is present and correct 603. If information is missing or incorrect, the process may continue to a determination block 604 that indicates at least some of the information as Not Valid. If appropriate information is present and is formatted correctly, then a URL Parser is called to make sure the overall format, including the appropriate information, is recognized 605. If not, the process may be deemed Not Valid 604 and one or more other actions may occur per the other action(s) block 608 (see, e.g., block 504 of FIG. 5, decay process of FIG. 4, etc.). If, however, the above are deemed valid, the link's source country's ISO2 will be determined and noted 606. As to appropriate information, it may include metadata used by a redirection service sufficient to determine, for example, a user, a country, and a store that the link was built from, which may optionally be a username and a store link itself.

Figure 7:
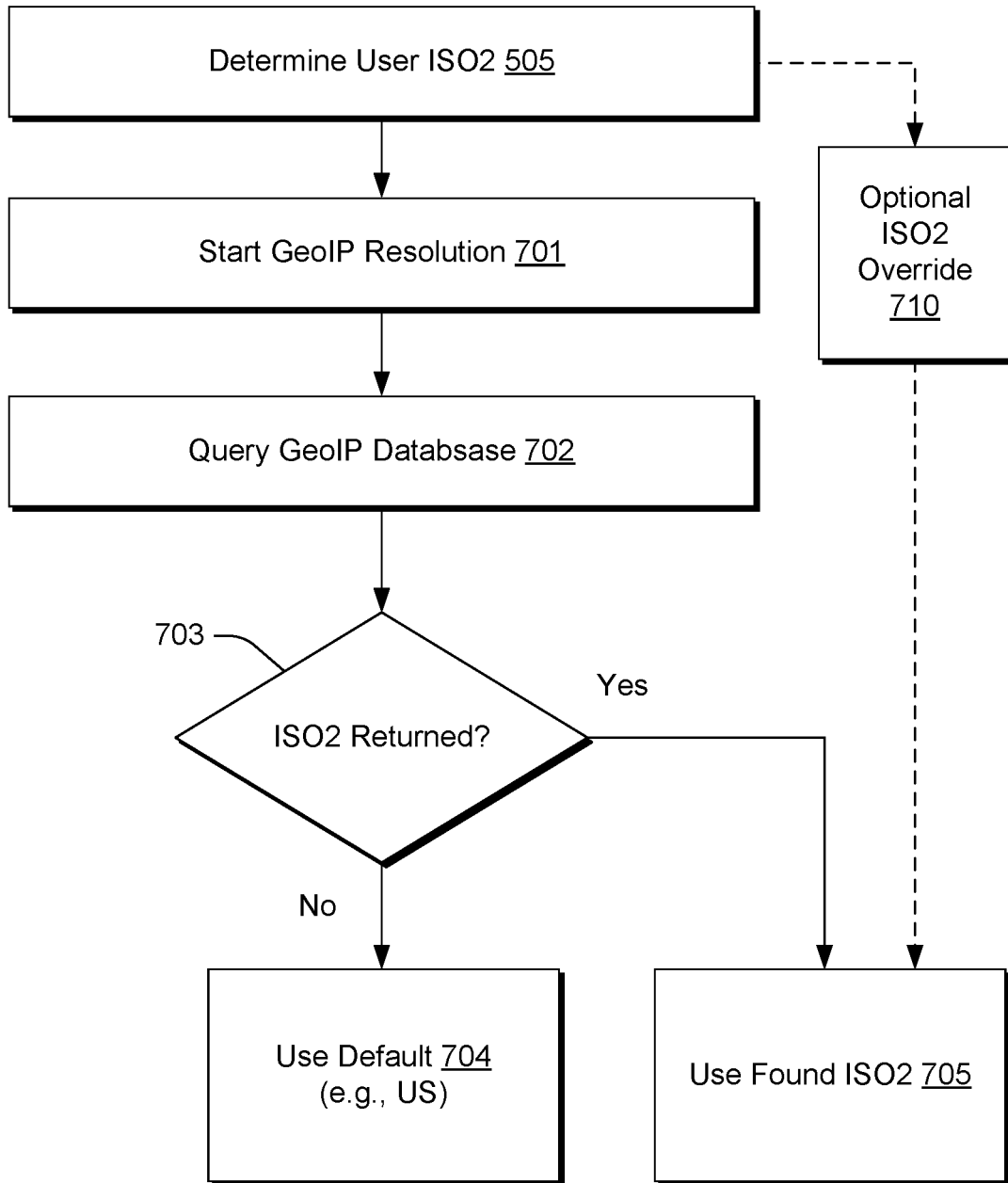
FIG. 7 is an example of a flowchart of the User ISO2 determination process shown in FIG. 5.

FIG. 7 shows a process 700, as corresponding to block 505 of the process 500 of FIG. 5. Once the original URL goes through the validation process and is deemed valid, the user's country ISO2 is determined 505. The process 700 is started by resolving the user's IP Address to the user's base country 701. This may be accomplished by querying a database that lists the ISO2 codes for each available country and the IP addresses present there 702. More generally, a data store may be accessed, which could be via an API provided by an advertiser (e.g., iTunes store, Amazon.com, etc.) or a database that may be proprietary to a redirection service (e.g., optionally built from a data feed provided by an advertiser), or a combination of an API and proprietary database or other manner (e.g., caching service, etc.). Per a decision block 703, if the user's ISO2 code is available based on their IP address, the database will report that code. If there is not an ISO2 code for the user's IP address, or if the IP address is not listed, a default (the US in this case) will be used 704. However, if the user's IP reports an ISO2 code, the reported code will be used instead 705.

As an example, if a redirection service geolocates an IP address to an ISO2 instead of a "no match" then it may be used. A person, system, etc., building a link may be able to override, for example, to use a specific ISO2 instead of IP address based approach to country or region determination (see, e.g., optional override block 710).

FIG. 8 shows a process 800, as corresponding to block 506 of the process 500 of FIG. 5. Based on the ISO2 that is determined in the previous step, the service will commence the process 800 in a commencement block 801 to find the target store that best matches the user's ISO2. In a decision block 802, a decision is made as to whether the Advertiser does not have a store front within the user's geographical region. If so, the user will be defaulted into, for example, the US store front 803.

However, if an online store front is available in the users geographical region, the service then searches to see if the online store front has an affiliate program per a decision block 804. If the store front does, the service will then continue on to the next step and will use an affiliate link 806. Alternatively, if the online store front does not have an affiliate program, then the service will continue without using an affiliate link 805. If the link continues without including the affiliate parameters then the Publisher will not be credited for this sale. However, the user will still make it to the geographically correct online store front to make the purchase, instead of being brought to a dead link or the wrong online store front where they might not be able to make the purchase.

As an example, a redirection service may redirect to a most geographically relevant store. For example, someone from Austria may buy regularly from an Amazon.de Internet store in Germany. Accordingly, traffic from Austria may be deemed as being appropriate for Germany. As an example, a redirection service may optionally encode all traffic from a country that does not have an affiliate program for a particular store or stores to pick up on any travelers or people that may have figured out a way to make purchases in a specific store (e.g., consider a scenario where people in Malaysia are using US iTunes gift cards to set up an account and buy content from the US iTunes store because there is no store in their country). A process may determine if metrics can be preserved while affiliate encoding all links and, if so, such encoding may occur.

FIG. 9 shows a process 900 that corresponds to the block 507 of the process 500 of FIG. 5. In the process 900, client support commences in a commencement block 901. A decision block 902 follows that decides if the Service Provider can use this particular link in order to "skim." Skimming is defined as the transparent process of rerouting a click with the Service Provider's affiliate code, instead of a Publisher's code for a pre-defined percentage of clicks. For example, if the effective skim rate is negotiated to be 15%, then 15 out of 100 clicks would be redirected to use the Service Provider's affiliate tracking parameters instead of the Publishers. Skimming may be a preferred revenue model of the Service Provider; however, one or more other types of models may be available, for example, depending on affiliate program or lack thereof. If the Publisher is not active with an affiliate program for a specific online store front but there is an active affiliate program then, by default, this link is skimmed.

As shown in FIG. 9, per the decision block 902, the process 900 will proceed to skip skimming 903 or to another decision block 904 to determine if skimming is allowable. If not, the process 900 continues at a tracking block 905 to track based on client. Otherwise, the process 900 continues at a tracking block 906 to track based on service (e.g., the GeoRiot service skims).

In the example of FIG. 9, at block 903, passive skimming may be handled as in block 906, where the redirection service may skim. A process may include checking to determine whether an Internet store has an affiliate network supported, if so then the process may include checking to determine whether its supported and continue on to, for example, block 904. If not supported, then such a process may include checking to determine whether the redirection service provider supports it. If so, the redirection service provider may skim it; otherwise, it may be passed on without any affiliate tracking (e.g., sent straight to the appropriate Internet store). In instances where a client supports the Internet store and the redirection service provider does as well, a default state may be to the decision logic block 904 (e.g., "can skim?").

FIG. 10 shows a process 1000 as corresponding to the block 508 of the process 500 of FIG. 5. After determining if the Publisher or the Service Provider will receive credit for any possible sales (through the skimming process) the process 500 starts to parse the data from the original URL, for example, per the process 1000 (e.g., as corresponding to the block 508). The service looks at the data within the link and checks to see if the pertinent information matches any of the Affiliate Networks for the particular store front, for example, via a series of decision blocks 1002, 1003 and 1004. These decision blocks aim to determine which of a number of Affiliate Networks the original link is from. As an example, the affiliate network (or at least a country, store, etc.) may be provided in a link indirectly according to a redirection service ID for a client or, additionally or alternatively, via metadata. If the form of the URL does not match any of the affiliate links, a Malformed URL error is thrown 1005. If the form matches one of the Affiliate Networks, then the next step is to create a matching Parser to read the data from the URL 1006. Parsing of ad data from the URL occurs next, at block 1007. Once the data has been read, the service may optionally query a data store specific to the Advertiser's store front to verify that the data is present, per block 1011. Such a query may be germane to one or more source/target country stores via an API, cache, local data, etc. Such a query may be local, remote or a combination of local and remote queries (e.g., via an API of an Internet store, a proprietary database of a redirection service, etc.). While the block 1011 is shown as being aligned with the Parse block 1007, it may be located elsewhere, for example, after block 1010.

After the Parse block 1007, a decision block 1008 follows that decides if the data matches what can be found in the store front. If so, the process 1000 continues to the next step with the parsed data 1010. If not, the process will halt and throw a Malformed URL error 1009.

An example of a link "build" process can optionally programmatically build a redirection service provider link from a catalog of raw landing page links. Such an approach may be appropriate where a database of raw links exists and links can be programmatically built. As an example, a base redirection service link may be http://target.georiot.com/Proxy.ashx?grid=64& where to this is added "GR_URL=" with a URL encoded raw landing page URL attached to the end. For example, if a target raw landing page URL is http://itunes.apple.com/us/album/once/id331012810?i=331013504, the URL is encoded to: http%3A%2F%2Fitunes.apple.com%2Fus%2Falbum%2Fonce%2Fid331012810%3Fi%3D331013504. Given a base "georiot" URL (e.g., http://target.georiot.com/Proxy.ashx?grid=64&), to this may be added "GR_URL=", followed by the encoded version of the raw landing page URL (e.g., as in previous step) to yield a quick build style link: http://target.georiot.com/Proxy.ashx?grid=64&GR_URL=http%3A%2F%2Fitunes.apple.com%2Fu%2Falbum%2Fonce%2Fid331012810%3Fi%3D331013504.

Another type of link is referred to as a "search" link, which may be appropriate where an existing affiliate link is not at hand, a landing page URL is not at hand, and some information or metadata about an item one wishes to link to is at hand. Such a link may, for example, be appropriate for handling a change in information of an Internet store, etc. For example, if an iTunes store changes the ID of the item linked to, some assurances are provided that the link will not break and that it will not have to be updated. Such a type of link may include parameters such as, for a music example: vendor (iTunes); type (Music); ArtistName (URL encoded text); Album Name (URL encoded text); and TrackName (URL encoded text). As an example for the Pearl Jam song "Jeremy," from the album "Ten" from an iTunes store: http://target.georiot.com/Search.ashx?grid={Client-ID}&vendor=iTunes& type=Music&ArtistName=Pearl+Jam&AlbumName=Ten&TrackName=Jeremy. As an example for a user to go to the artist page for "Lady Gaga" in an iTunes store: http://target.georiot.com/Search.ashx?grid={GRID}&vendor=iTunes&type=Music&ArtistName=Lady+GaGa.

FIG. 11 shows a process 1100 that corresponds to the block 509 of the process 500 of FIG. 5. Once the data has been parsed from the URL, the service will then attempt to match that data to an item in the appropriate online store front. The process 1100 commences in a commencement block 1101 by taking the information from the parsed data in the previous step. Given the parsed information, an item ID may be present, which is then taken for further processing 1102. In a decision block 1103, a query, a lookup, etc., may be performed to determine whether an item exists in the destination store (i.e., appropriate country store) that corresponds to the item ID from the parsed URL. Based on such a query, lookup, etc., the decision block 1103 decides if that item exists (e.g., a matching ID is found that corresponds to the ID from the parsed URL). If that item exists, then the user will be directed to that item in the destination store (e.g., appropriate country store) 1104. However, if the specific item does not exist or is otherwise not retrieved via a query, lookup, etc., the best match will be determined, for example, in a process of using less specific queries until a suitable match may be found. If no match is found then one or more other actions may occur per another action(s) block 1110, for example, a link to the general store front may be used for redirecting a user.

Again, where the decision block 1103 decides that the item is not found in the destination store (e.g., appropriate store for a user), the service may proceed to a determination block 1105 to determine one or more search criteria (e.g., based on metadata). The determination process includes a query or lookup 1106, for example in a source country store (e.g., store associated with activated URL) or database using at least some information about the item (e.g., at least some metadata from the original URL). A determination block 1107 follows that determines one or more aspects of the item, for example, a "type" the item may be classified as (e.g., digital media, a product, a service, an app, etc.).

In a decision block 1108, the additional information may be used to once again perform a query, lookup, etc., to determine if the item can be found in the destination store (e.g., appropriate store for the user). Since there are some items that may be unavailable in all stores, the last query, lookup, etc., sent in this process may be to determine if the exact item being requested is available within the specific country's store. If the item is available in that particular country's store, the best match to the parsed data (e.g., and optionally from data retrieved from an API, data store, etc., about an item defined in the metadata that was parsed) will be the individual item within the store front 1109. If not, the "best match" may be to redirect the user to the destination store front instead, as another action 1110. For example, if the original link was for a specific song and the service first tried to find that specific song, if there is no match the service may search for the same artist and, if still no match, then the service may search for the correct media type (music) and again if a match is not present the final result may be a link to the general store front. As an example, the decay process of FIG. 4 may be implemented.

A process can include parsing data from a URL associated with a source store. In turn, a query may be issued to a destination store (e.g., an appropriate country or regional store) using the parsed data, which may include an item ID. If, in response, the item is identified, then a user may be redirected to that item. However, if, in response, the item is not identified, then a "best match" process may commence, which may or may not find that exact same item. Such a process may query the source store using an item ID and then extract additional data (e.g., metadata) about the item. Using this additional data, the destination store may once again be queried in an effort to, optimally, find the exact same item. However, as the additional data may not be sufficient to uniquely identify the item, a next best effort may be to provide a URL to a group of items at the destination store (e.g., an album, a tool category, a director's films, etc.). Such a process may be iterative in that some metadata may be used first and if a unique item is not returned, then more metadata may be used.

As an example, consider a US-based user on an iPhone running an application about cooking (e.g., the application "Guia do Churrasco" for planning an authentic Brazilian barbeque). The user may navigate various types of cuts of meat, etc., and the application may display an ad banner for a particular 10 inch hardened steel knife having a wooden handle sold by a company that has Internet store locations in the US and Brazil. Using the redirection service, the user will be directed to the US Internet store and, if not to the exact same knife, according to a best match or decay process, to a page of the US Internet store that displays, for example, a number of 10 inch hardened steel knives having wooden handles (e.g., manufactured by the same manufacturer, etc.).

FIG. 12 shows a process 1200 as corresponding to the block 510 of the process 500 of FIG. 5. As shown, once the end destination is determined, the service will transform information associated with the original URL into a new URL to get the user to the proper destination 1201 (e.g., formulate and format an appropriate link). The final URL will include the previously defined affiliate code (either the Publisher's or the Service Provider's, depending on skimming) if applicable. If the destination online store front does not have an affiliate program the link will not contain any tracking code or may include a most probable or a default affiliate code (e.g., to catch travelers, etc.) 1202. A formatted URL is provided by block 1203 (as formulated to provide appropriate redirection and optionally other information).

FIG. 13 shows a process 1300 as corresponding to the block 511 of the process 500 of FIG. 5. The process 1300 commences in a commencement block 1301. After the URL has been formulated into a new link with the proper tracking and affiliate codes, the click information is then queued for being persisted into the Service Provider's database 1302. As mentioned, the information regarding the user's IP address, geolocation, date, time, item clicked on, original price, sale price, media type, tracking code, etc. may be queued up to be stored into the Service Provider's database for tracking and reporting purposes. As shown in the example of FIG. 13, this information is persisted 1303, for example, for later use for the Publisher's benefit to determine where their traffic is coming from and for trend analysis purposes.

FIG. 14 shows a process 1400 as corresponding to the block 512 of the process 500 of FIG. 5. The process 1400 commences in a commencement block 1401. As mentioned, once the click's information has been queued for persistence into the Service Provider's database, the last step in the process 500 is to redirect the user using the new URL created in block 510 (see, e.g., FIG. 12). The entire process 500 up through this point may be hidden from the user and performed, for example, within several milliseconds so users are unaware of the URL redirection. At this point, the user will be cleanly redirected using an HTTP redirect 1402 (e.g., a 3XX redirect such as 302—"Found" or other 3XX redirect or equivalent thereof). At this point the user is redirected to the appropriate item in their geographically specific store, or into the default (e.g., US) store if their location doesn't have a unique store front 1403. Examples of 3XX redirects include: 301 Moved Permanently; 302 Found; 303 See Other; 304 Not Modified; 305 Use Proxy; 306 Switch Proxy; 307 Temporary Redirect; and 308 Resume Incomplete.

Figure 15:
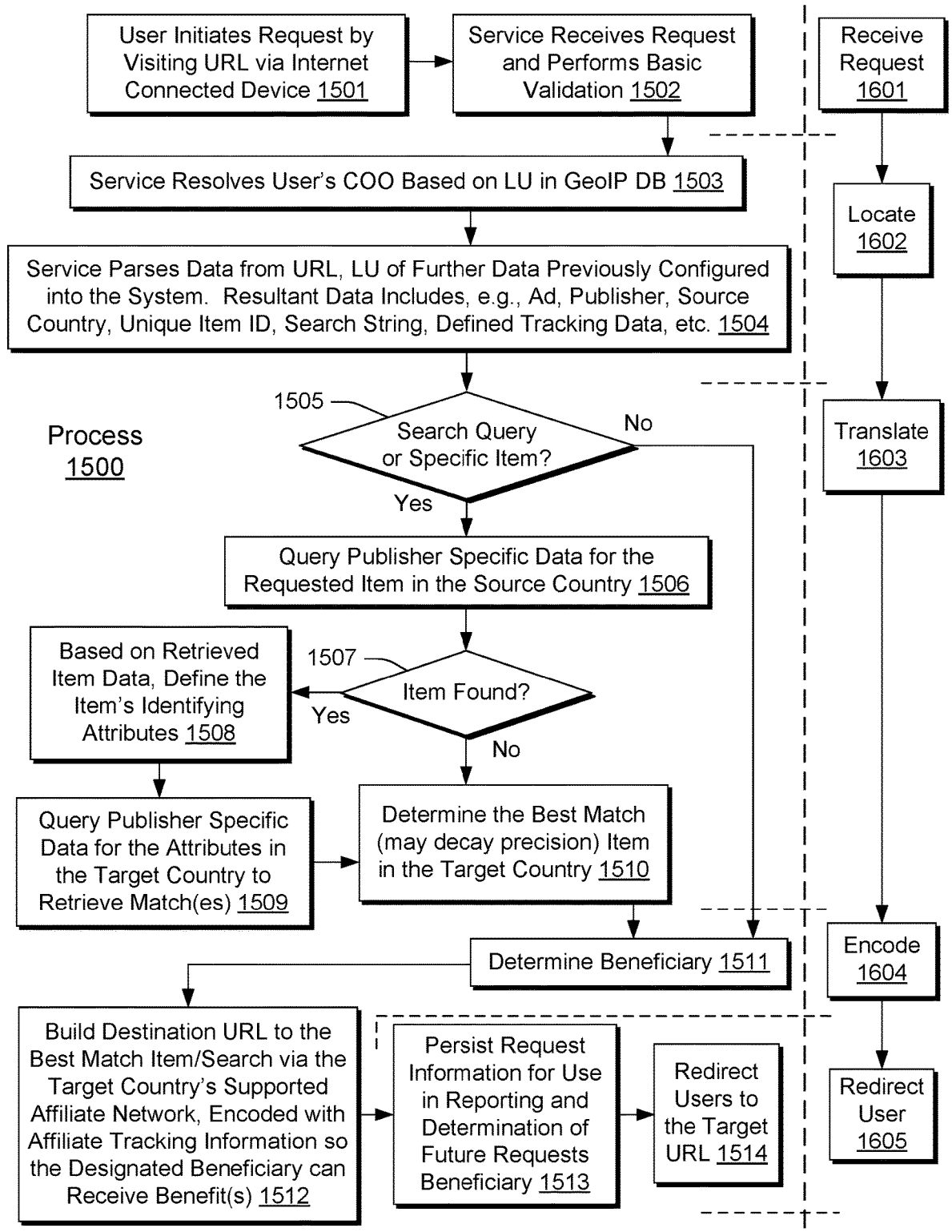
FIG. 15 is an example of an overview of a process starting with receiving a request through redirecting a user to an appropriate destination.

FIG. 15 shows an example of a process 1500 that occurs when clicking on a link. The process 15000 starts with a link on the Publisher's property initiated by a user 1501 and finishes with the final redirection 1514, the user ending at the most relevant page in the appropriate online store front. Also shown in FIG. 15 are blocks 1601, 1602, 1603 and 1605, which are part of a process 1600 shown in FIG. 16, which represents a breakdown of the process 1500 into five general steps: Receive Request 1601, Locate 1602, Translate 1603, Encode 1604 and Redirect User 1605.

Figure 16:
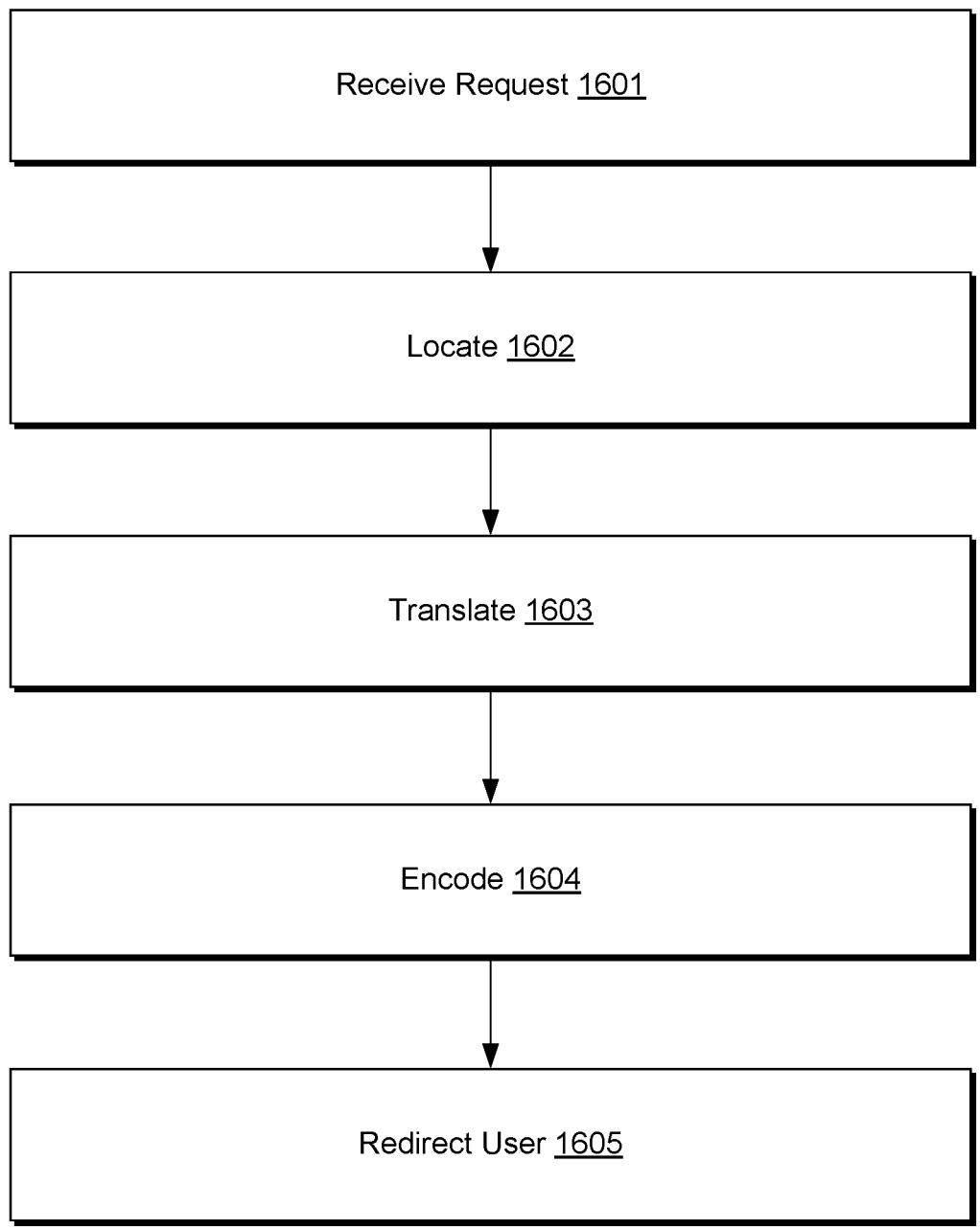
FIG. 16 is an example of a flowchart of details mentioned in FIG. 15.

As shown in FIGS. 15 and 16, the process 1500 or 1600 starts when the service receives a request through a specialized affiliate link (Receive Request 1601). For the second step, the service goes through a process to determine where the user is geographically located by looking up their IP address in a GeoIP database. This step also includes parsing relevant information from the URL (Locate 1602). After the user is located, the service will then determine the most applicable URL for the user by identifying data in the requested URL. The service will lookup details about the intended destination, whether it be to a specific item, or more general (e.g., this can include taking into account search items, category links, etc.). The service will then, using the data from the previous query, locate the best match for the user's geographic location (Translate 1603). Once the end point is determined, the service will create a new URL for the store front and item. If there is no perfect match for the intended item the system will allow the precision to decay until a best match is made. The new URL takes into account the appropriate affiliate encoding (Encode 1604). Finally, the user will be redirected to the appropriate affiliate network (Redirect User 1605).

Referring to the various details of FIG. 15, the process 1500 commences at step 1501 when a user initiates a request by visiting an affiliate link from any Internet connected device, which can include but is not limited to laptops, desktops, smart phones, and tablet computers.

The service receives the request and performs a basic URL validation process at 1502. The process includes ensuring the necessary information is included for the user to get to their destination as well as checking the general format of the link.

After the request has been received, the next step 1503 is to resolve the user's Internet Protocol (IP) Address against a list of IP blocks and geographic regions in order to place the user within a geographical location. This is a common practice called "geolocation." If the system is unable to determine the country of origin, it will assume a default target country (e.g., US).

The following step 1504 determines the format of the incoming URL so that data can be gathered. The URL is matched against a list of supported formats. Once the format is determined the service is able to extract the data required. Based on this data the service is able to determine items such as Advertiser, Publisher, Source Country, Unique Item Identifier, Search String, and tracking data.

At this point, the process 1500 can split based on what data was identified in step 1504. The data can either be for a specific item or can contain search criteria (see step 1505). If the data contains search criteria then the process resumes at step 1511. If the data identified is for a specific item at 1505, the service will then query a data store specific to the Advertiser's store front at step 1506. If the data store returns information for the item specific query then the process moves to step 1507. If no data is returned the process moves to step 1510. When data is returned from the original data source, the service notes the item's relevant attributes as at 1508. Those relevant attributes are then used to query the data source specific to the user's location at 1509.

Depending on the quality and number of results returned the service may repeat the query with reduced precision by omitting certain relevant attributes at 1510. This process will continue until a best match is determined. The best match may have the same or reduced precision as the requested item.

The next step 1511 for the service is to determine who will be the beneficiary of the potential commissions that come from this URL through the process of "skimming". Skimming is defined as the transparent process of rerouting a click with the Service Provider's affiliate code, instead of a Publisher's, for a pre-defined percentage of clicks. For example, if the effective skim rate was 15% then 15 out of 100 clicks would be redirected to use the Service Provider's affiliate tracking parameters instead of the Publisher's.

The determined beneficiary will have their specific affiliate tracking parameters attached to the final URL. If the Publisher is not active with an affiliate program for a specific online store front but there is an active affiliate program then by default this link is skimmed. The encoding of the new URL with the Service Providers affiliate tracking information is a revenue driver.

Once the end destination and beneficiary are determined, the service will, based on information associated with the original URL, formulate a new URL to get the user to the proper destination based off the steps above 1512. The new URL will be encoded with the affiliate tracking information for the beneficiary, and will point to the result that was determined to be the best match from the original URL. If the destination online store front does not have an affiliate program the link will not contain any tracking code.

After the URL has been reformulated (e.g., reformulated, translated, etc.) into the new deep link with the proper tracking and affiliate codes, the click information is then persisted into the Service Provider's database in step 1513. The information regarding the geolocation, date, time, and item they clicked on is queued up to be stored (e.g., persisted) into the Service Provider's database for tracking, reporting, and future skimming purposes (e.g., stored locally and then directed to a database for longer term storage). This information may be later used for the Publisher's benefit and determining traffic origin and for trend analysis purposes, reports, etc.

Once the click information has been queued for persistence into the Service Provider's database, the last step 1514 in the process is to redirect the user using the new URL created. The entire process up through this point is transparent to the user. Finally, the user is redirected to the best match item in their geographically specific store, or into the default store if their location doesn't have a unique store front.

Figure 17:
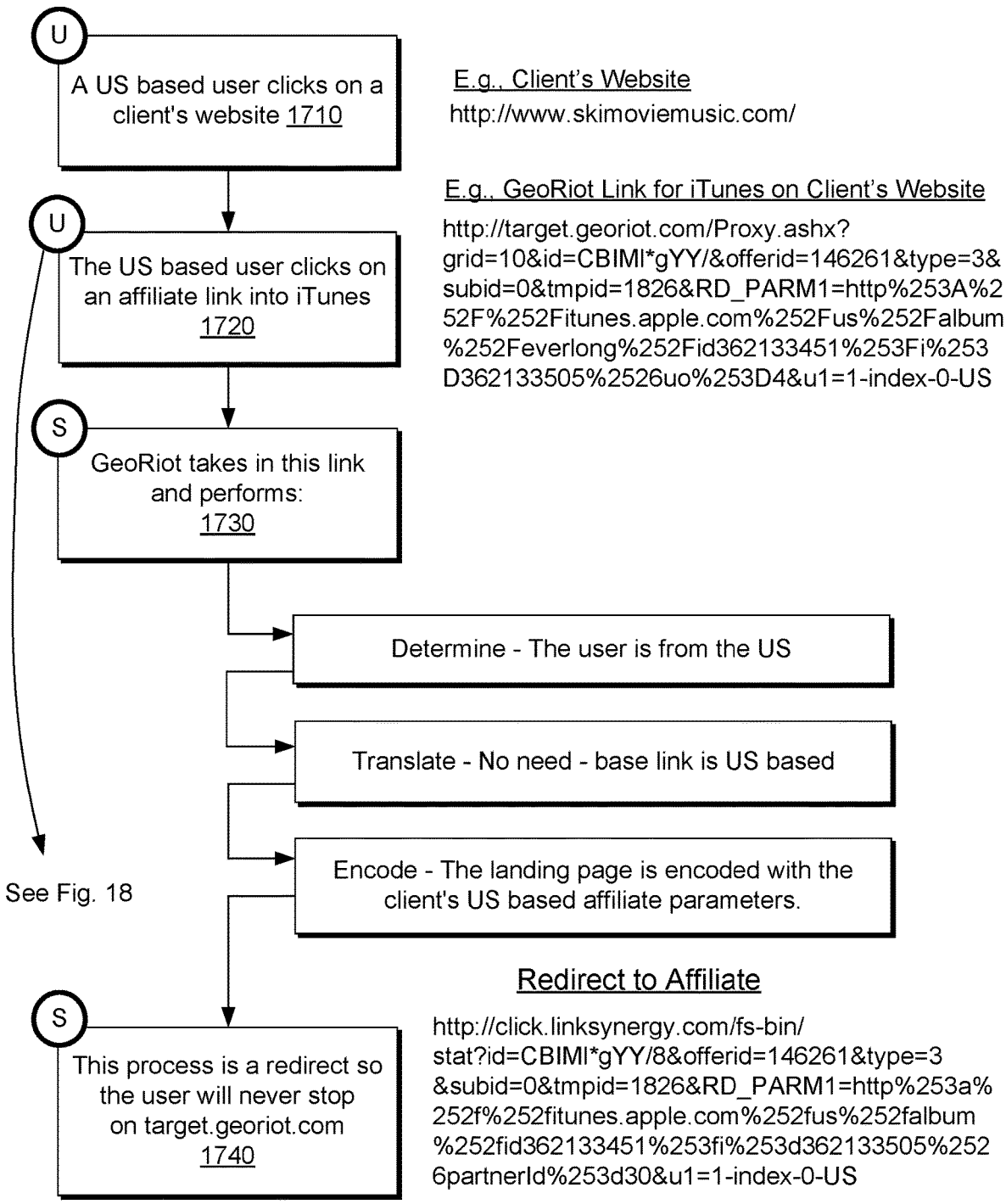

FIGS. 17 and 18 show an example of a method 1700 for redirection. The method 1700 commences in a click block 1710 where a US based user clicks on a client's website (e.g., or a user interface presented via an application executing on a device). As to the term "client", this refers to a client of a redirection service "GeoRiot". In another click block 1720, the user clicks on an affiliate link (e.g., activates a link via an application such as a web browser application or other type of application). In a performance block 1730, the redirection service takes the link (e.g., a URL) and performs various actions, including determining geolocation, deciding whether translating is required and encoding. As indicated in a redirect block 1740, the process performed by the redirection service occurs without having the user "stop" on the redirection service's site (e.g., target.georiot.com).

Continuing with FIG. 18, in a reception block 1750, the indicated affiliate (LinkShare aka linksynergy) receives the affiliate link with affiliate information from the redirection service (GeoRiot). In a concatenation block 1760, the affiliate concatenates the landing page information and tracking information (e.g., using an ampersand, as specified by an Internet store, etc., having an affiliate program). In a transmission block 1770, the affiliate transmits the link and converts the tracking information to an affiliate cookie. In a landing block 1780, the user lands at an appropriate landing page for the Internet store where the affiliate cookie is set for consumption by the Internet store's affiliate program for the benefit of the affiliate.

In the example of FIGS. 17 and 18, as the user is a US based user, it is determined by the redirection service (GeoRiot) that the appropriate Internet store is a US iTunes store, which has an affiliate program (LinkShare) for which the client is a member.

As described herein, a method may "skip" an affiliate network redirect while still appending parameters to the end of a store link (e.g., just as an affiliate network may perform), for example, to enhance performance (e.g., end to end performance).

Figure 19:
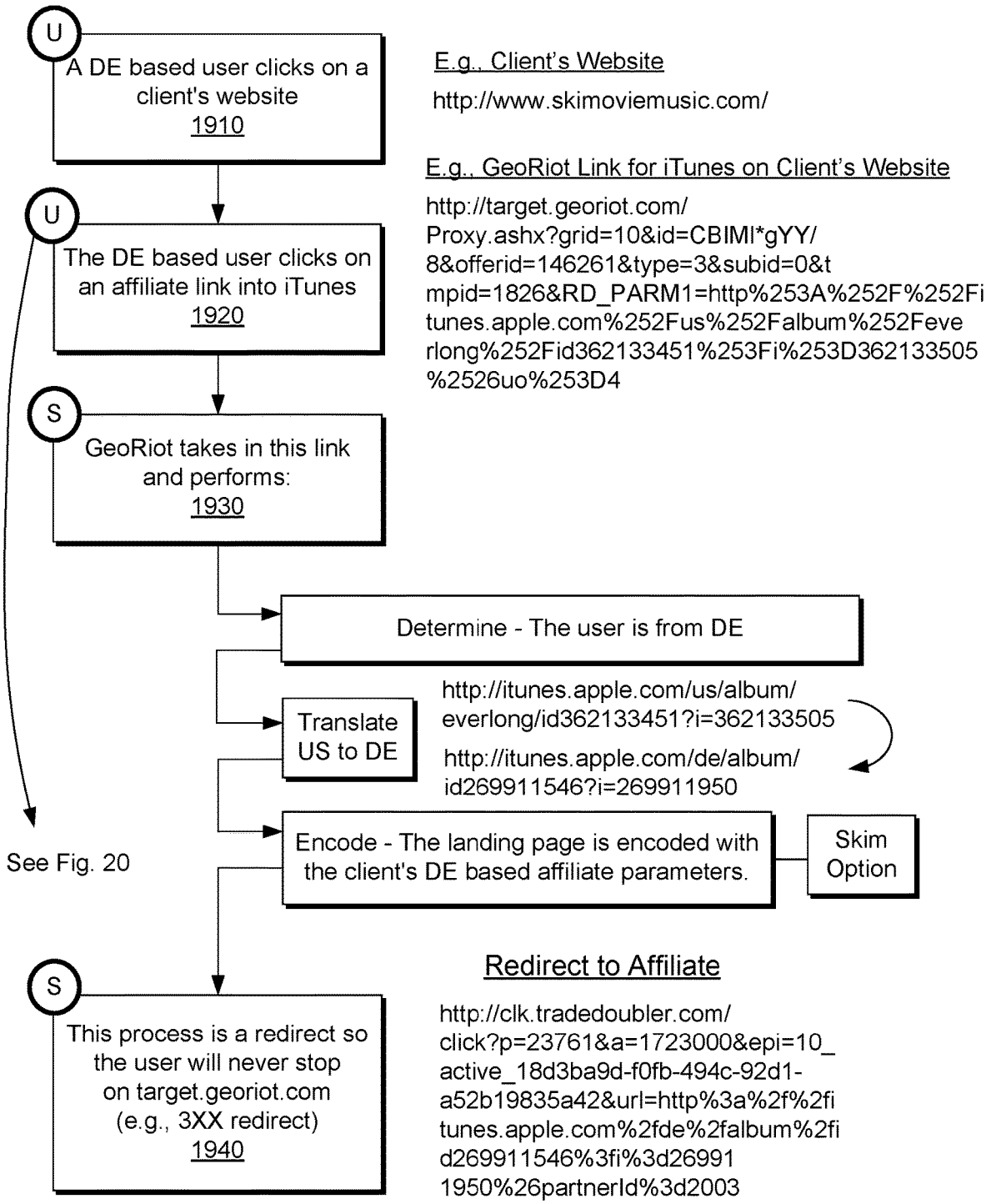

FIGS. 19 and 20 show an example of a method 1900 for redirection. The method 1900 commences in a click block 1910 where a German (DE) based user clicks on a client's website (e.g., or a user interface presented via an application executing on a device). As to the term "client", this refers to a client of a redirection service "GeoRiot". In another click block 1920, the user clicks on an affiliate link (e.g., activates a link using an application such as a web browser or other type of application). In a performance block 1930, the redirection service takes the link (e.g., a URL) and performs various actions, including determining geolocation (e.g., of a device used by the user and executing the application that provides for activation of the link), deciding whether translating is required and encoding. In the example of FIGS. 19 and 20, as the determination of geolocation indicates that the user is located in Germany (DE), the redirection service determines that translating is required (see also, e.g., override, etc.). The translation process formulates an appropriate URL that allows for redirecting the DE user to the appropriate page on a German store front (e.g., via an affiliate network or not).

As indicated in a redirect block 1940, the process performed by the redirection service occurs without having the user "stop" on the redirection service's site (e.g., target.georiot.com). Such a process may occur via a 3XX redirect (e.g., as specified by the HTTP).

Continuing with FIG. 19, in a reception block 1950, the indicated affiliate network (Tradedoubler) receives the affiliate link with affiliate information from the redirection service (GeoRiot). In an affiliate redirection block 1960, the affiliate is redirected to the DE store. In a transmission block 1970, the affiliate transmits the link and converts the tracking information to an affiliate token. In a landing block 1980, the DE user lands at an appropriate landing page for the Internet store where the affiliate cookie is set for consumption by the Internet store's affiliate program for the benefit of the affiliate.

In the example of FIGS. 19 and 20, as the user is a DE based user, it is determined by the redirection service (GeoRiot) that the appropriate Internet store is a DE iTunes store, which has an affiliate program (TradeDoubler) for which the client is a member.

Figure 21:
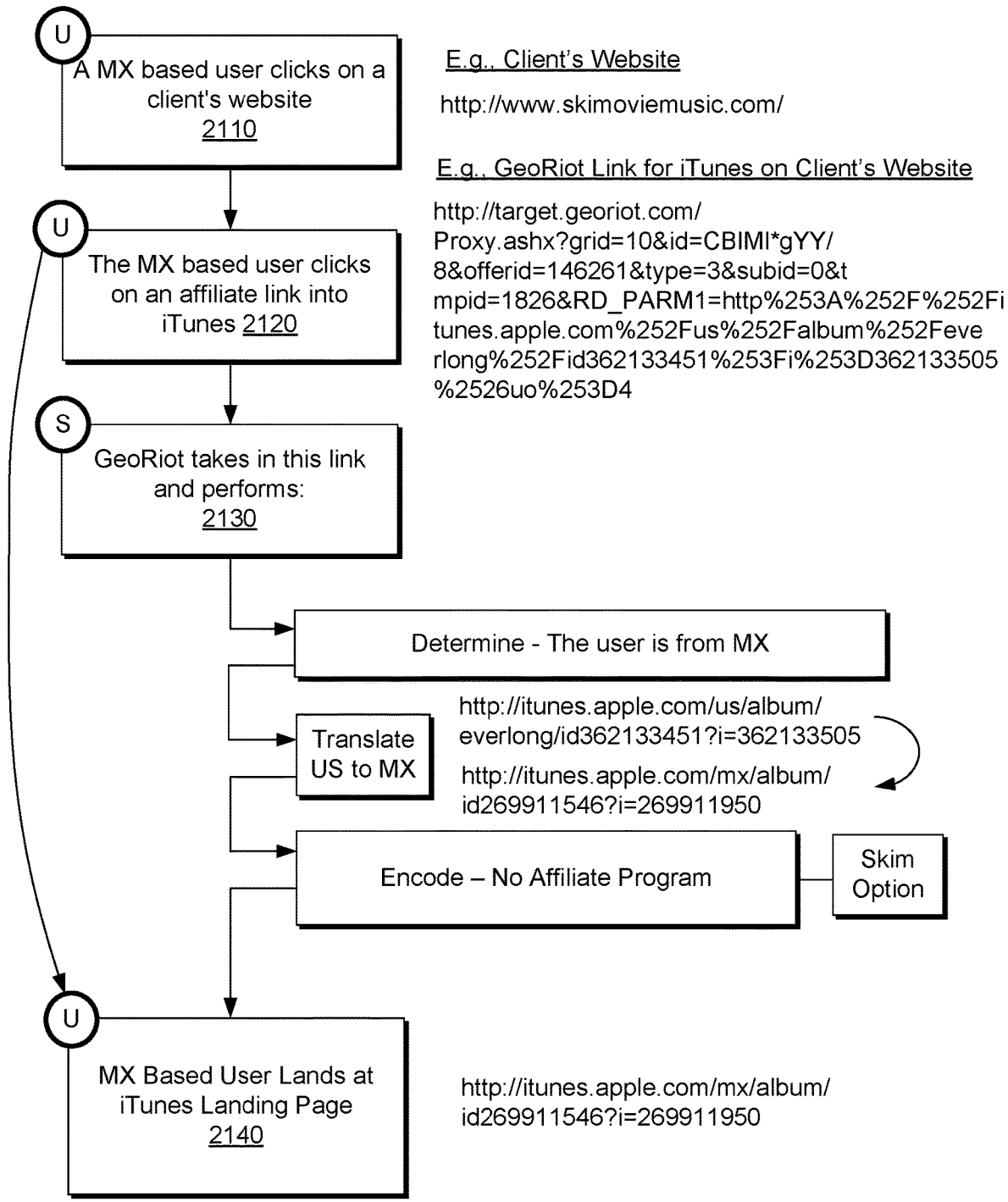
FIG. 21 is an example of a method for redirection where a user's country differs from the source country, however the user's country lacks an affiliate program.

FIG. 21 shows an example of a method 2100 for redirection. The method 2100 commences in a click block 2110 where a Mexican (MX) based user clicks on a client's website (e.g., or a user interface presented via an application executing on a device). As to the term "client", this refers to a client of a redirection service "GeoRiot". In another click block 2120, the user clicks on an affiliate link (e.g., activates a link using an application such as a web browser or other type of application). In a performance block 2130, the redirection service takes the link (e.g., a URL) and performs various actions, including determining geolocation, deciding whether translating is required and encoding. In the example of FIG. 21, as the determination of geolocation indicates that the user is located in Mexico (MX), the redirection service decides that translating is required. The translation process formulates an appropriate URL that allows for redirecting the MX user to the appropriate page on a Mexican store front. However, as indicated, no encoding is required because an affiliate program does not exist for the geolocation, as determined. Accordingly, a skim option may be implemented, for example, as discussed with respect to the process 500 of FIG. 5.

As indicated in a redirect block 2140, the process performed by the redirection service occurs without having the user "stop" on the redirection service's site (e.g., target.georiot.com). Such a process may occur via a 3XX redirect (e.g., as specified by the HTTP).

In the example of FIG. 21, as the user is a MX based user, it is determined by the redirection service (GeoRiot) that the appropriate Internet store is a MX iTunes store, which does not have an affiliate program.

Figure 22:
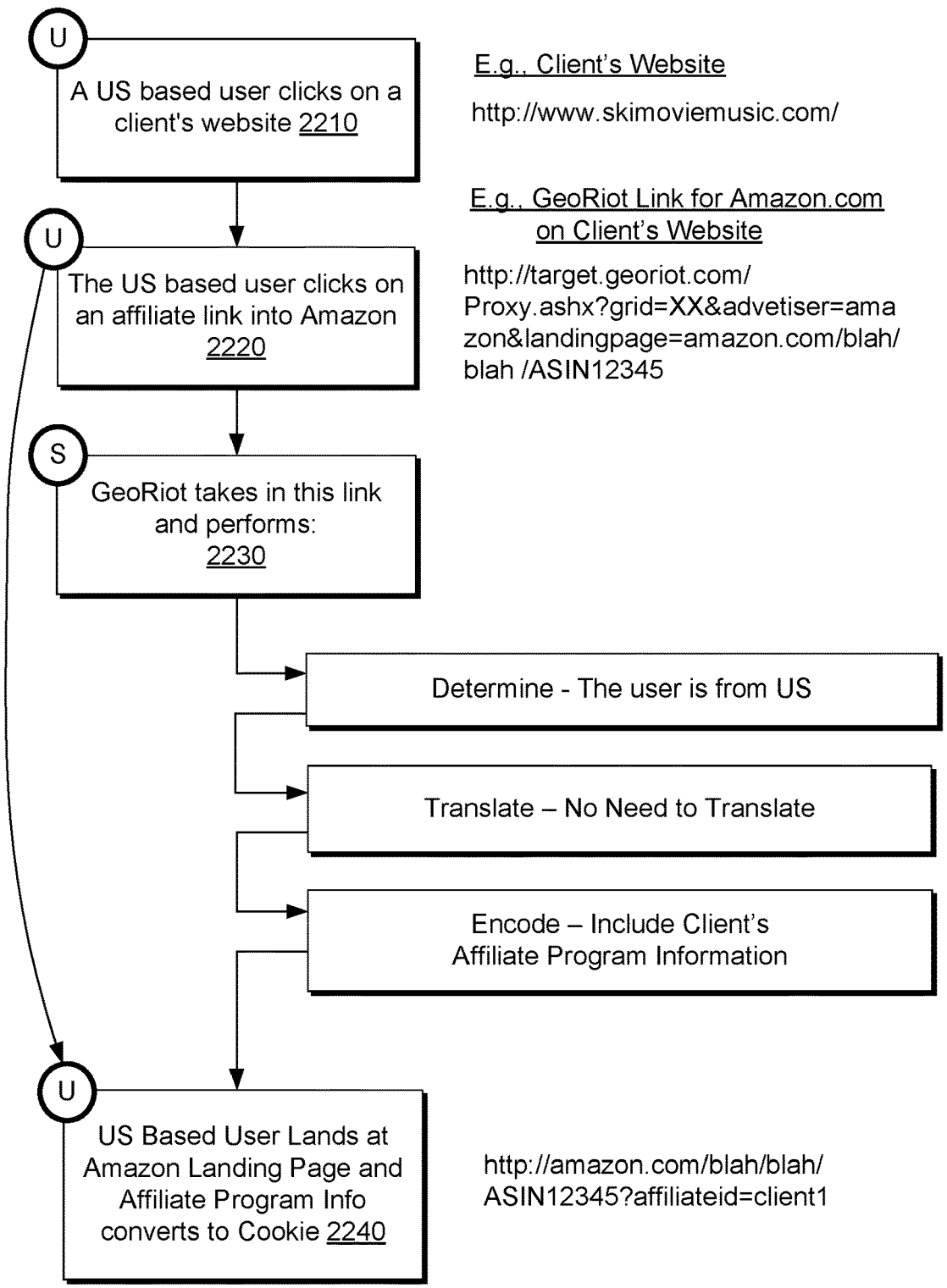
FIG. 22 is an example of a method for redirection where a user's country matches the source country, and the country is affiliate supported.

FIG. 22 shows an example of a method 2200 for redirection. The method 2200 commences in a click block 2210 where a US based user clicks on a client's website (e.g., or a user interface presented via an application executing on a device). As to the term "client", this refers to a client of a redirection service "GeoRiot". In another click block 2220, the user clicks on an affiliate link (e.g., activates the link via an application such as a web browser or other type of application). In a performance block 2230, the redirection service takes the link and performs various actions, including determining geolocation (e.g., of a device associated with the application being used by the user), deciding whether translating is required and encoding. As to encoding, the particular affiliate "amazon.com" has a program that differs from that of iTunes. Thus, encoding accounts for such differences and encodes a URL to include appropriate information according to the program of amazon.com.

As indicated in a redirect block 2240, the process performed by the redirection service occurs without having the user "stop" on the redirection service's site (e.g., target.georiot.com).

Figure 23:
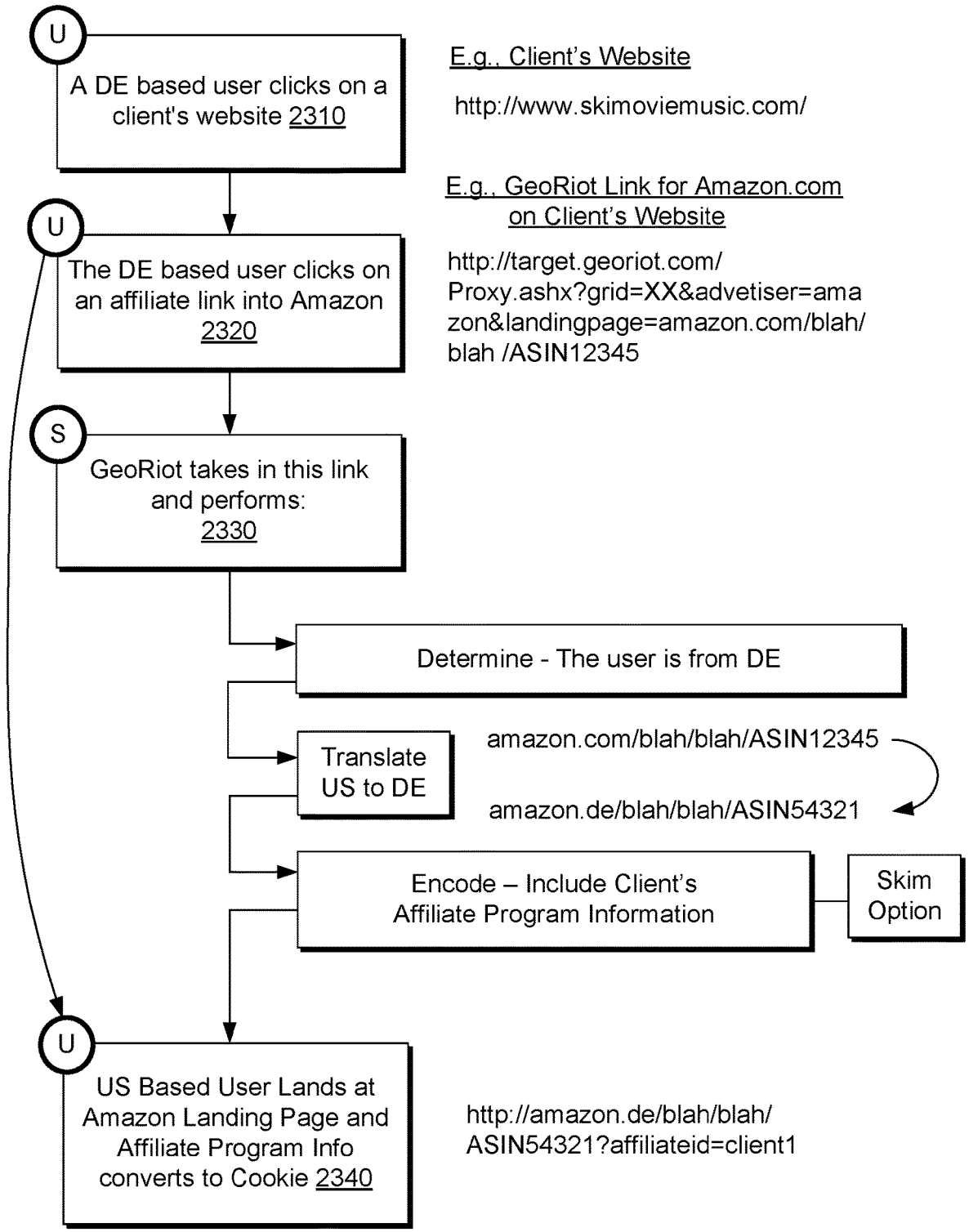
FIG. 23 is an example of a method for redirection where a user's country differs from the source country, and is affiliate supported.

FIG. 23 shows an example of a method 2300 for redirection. The method 2300 commences in a click block 2310 where a German (DE) based user clicks on a client's website (e.g., or a user interface presented via an application executing on a device). As to the term "client", this refers to a client of a redirection service "GeoRiot". In another click block 2320, the user clicks on an affiliate link (e.g., activates the link via an application such as a web browser or other type of application). In a performance block 2330, the redirection service takes the link (e.g., a URL) and performs various actions, including determining geolocation, deciding whether translating is required and encoding. In the example of FIG. 23, as the determination of geolocation indicates that the user is located in Germany (DE), the redirection service decides that translating is required. The translation process formulates an appropriate URL that allows for redirecting the DE user to the appropriate page on a German store front. As to encoding, the particular affiliate "amazon.com" has a program that differs from that of iTunes. Thus, encoding accounts for such differences and encodes a URL to include appropriate information according to the program of amazon.com, for the DE store of amazon.com.

As indicated in a redirect block 2340, the process performed by the redirection service occurs without having the user "stop" on the redirection service's site (e.g., target.georiot.com).

In the example of FIG. 23, as the user is a DE based user, it is determined by the redirection service (GeoRiot) that the appropriate Internet store is a DE amazon.com store.

As described herein, translation of a URL can enhance user experience, optionally with decay to control user experience when a user tries to access an "incorrect" store. As to affiliates, a process may optionally handle an internal affiliate or an external affiliate. For example, the amazon.com model may be referred to as an internal affiliate while the iTunes model may be referred to as an external affiliate. A process may optionally provide for skimming by a redirection service. For example, such skimming may be passive (e.g., where client has no account in country) or active (e.g., changing affiliate tracking parameters from client's to that of a redirection service).

As an example of a redirection process, consider a user in Germany browsing and wanting to buy a song as listed on a redirection service's client's website, that is based in the US (e.g., with a link to a US e-commerce store). In such an example, when the user clicks on the link, the redirection service collects metadata (e.g., user's locale and intended destination) and redirects the user (e.g., using API or other mechanism to do searches and lookups) to a German e-commerce store, (hopefully to the desired song, ready to purchase with a single click). In turn, the user may buy the song from the German e-commerce store (e.g., not even knowing she has been redirected).

A client of a redirection service may be part of an affiliate program, which may provide a commission for directing sales to an Internet store (e.g., iTunes US where the client's website has an affiliate link to iTunes US). Where a client wants commissions on all purchases worldwide, that client may have to sign up with as many affiliate programs available in as many countries. As an alternative, a redirection service may allow that client to merely sign up with the redirection service where the redirection service manages affiliate programs in various regions. Accordingly, in such an example, when the client signs up for the redirection service, that client may be automatically provided use of all relevant affiliate programs simultaneously (e.g., via a single link per item on the client's site). In such an example, prospective purchasers (e.g., users) are redirected to appropriate Internet store fronts (e.g., iTunes stores) that may be country specific stores where the redirection service ensures proper affiliate tracking for its client.

As to skimming, a redirection service may practice passive skimming, for example, where the redirection service collects commissions where its client is not a member of an affiliate program in a foreign country. As to active skimming, this pertains to situations where the client of the redirection service is active with an affiliate program associated with destination store but the affiliate tracking is switched to use the redirection service's account instead of the client's accounts. As an example, active skimming may happen for countries where translation is necessary (not for their base program/country/link) and active skimming may happen where passive skimming is not high enough to meet an agreed upon percentage (e.g., 15% or other percent).

Figure 24:
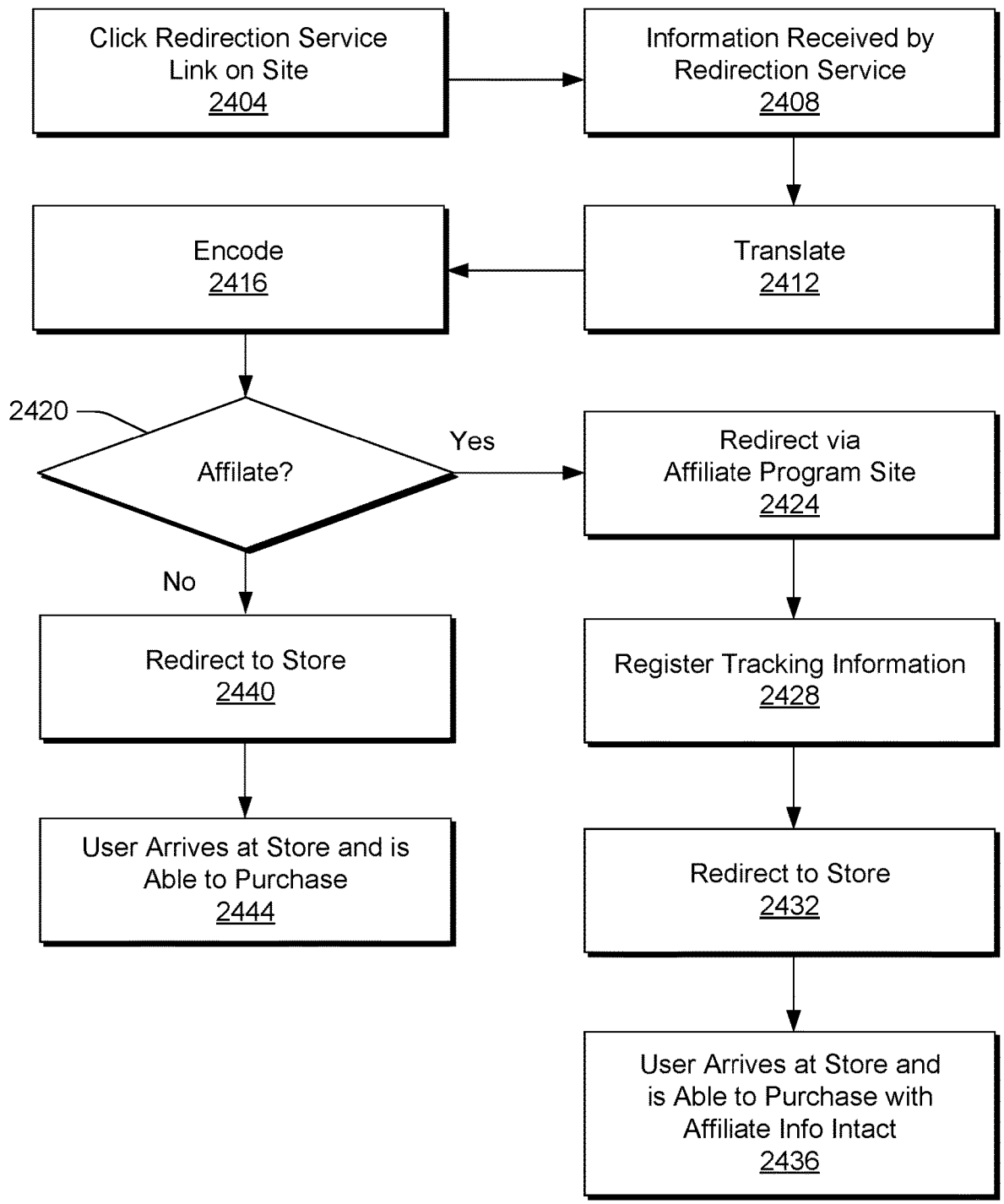
FIG. 24 is an example of a method for redirection.

FIG. 24 shows an example of a method 2400. In a click block 2404, a user clicks on a redirection service enabled link from an iOS app, website, blog, etc. In a reception block 2408, the redirection service receives information transmitted in response to the click, where the redirection service determines the user's location and an Internet store associated with the link. In a translation block 2412, the redirection service translates the link to a redirection URL that matches the Internet store for the user. In an encode block 2416, the redirection service encodes the redirection URL with proper affiliate parameters, if appropriate, for the determined user's Internet store. In a decision block 2420, a decision is made as to whether the site is a member of an affiliate program (e.g., is the site owner, as publisher of the site an "affiliate"). If the decision block 2420 decides that the site is not an affiliate, then in a redirection block 2440, the redirection service redirects the user via the redirection URL to the Internet store. As indicated, in an arrival block 2444, the user arrives at the Internet store and is able to purchase an item associated with the redirection enabled link that appeared on the iOS app, website, blog, etc.

If the decision block 2420 decides that the redirection service enabled link indicates that the publisher of the site is an affiliate of an affiliate program, in a redirection block 2424, the redirection service redirects the user via an affiliate program site using a redirection URL that includes affiliate information. In a registration block 2428, the affiliate program site registers tracking information. In a redirection block 2432, the affiliate program site redirects the user to the Internet store using an appropriate URL. In an arrival block 2436, the user arrives at the Internet store and is able to purchase an item associated with the redirection enabled link that appeared on the iOS app, website, blog, etc., where the affiliate information is intact.

As an example, if the item is an iTunes store item and the user is located in the US or Canada that user may be redirected through LinkShare. If that user is located in one of the countries in Europe, for example, that user may be redirected through TradeDoubler. If that user is located in Australia or New Zealand that user may be redirected through DGM Pro, and if that user is in Japan then that user may be redirected through LinkShare Japan.

In the example of FIG. 24, in the process of an affiliate network redirect, the click may be recorded and a cookie placed. For example, in block 2432, the user may be redirected to the iTunes Preview page where the affiliate cookie is placed and in block 2436, the user is then redirected onto the relevant landing page inside the store. In such an approach, because the user was directed to the correct store with the proper affiliate tracking the user is able to buy the product they were initially interested in purchasing and the publisher of the site will receive any resulting commissions. As indicated by blocks 2440 and 2444, if the user clicks on a link for an iTunes item and it is determined that the user is coming from a country where there is no affiliate program, that user may be redirected to the proper iTunes store (e.g., according to the translation block 2412, which can translate a link for one country store to a different country store based on country of a user). Accordingly, the user will be able to purchase her desired item but no commission will be generated because there is no supporting affiliate program for that store.

While the example of FIG. 24 is shown as including a redirection service and an affiliate program site, a redirection service may optionally be included as a service of an affiliate program site. In such an example, where the redirection service of the block 2408 is a service of the affiliate program site, the block 2416 may continue directly to the block 2428. In the example of FIG. 24, a determination process may optionally be implemented to determine a beneficiary (e.g., one or more parties that should or may benefit from traffic, a redirect, a purchase, etc.).

As described herein, a redirection service can provide a link "proxy" service that allows for multiple geographically-segmented affiliate programs to be used simultaneously. The service can send a click on an affiliate link first to the redirection service where the service geo-targets where the user is coming from, translates the link to work best for the user's regional store and then affiliate encode the link such that the site owner (e.g., publisher, affiliate, client, etc.) receives commissions on possible sales.

A redirection service can proceed via three steps to ensure that the final URL is best matched for a user and her regional Internet store. Such an approach ensures the site owner (e.g., publisher, affiliate, client) that it is maximizing its commissions and that the user does not receive an error after clicking on the item's link as it is provided according to the redirection service.

A redirection service may use geo targeting, which is a practice of delivering content that is specific to a user's location. The redirection service may implement a process (e.g., IP address resolution or other) that identifies where the user is clicking from in order to determine which Internet store is the best match for that user.

A redirection service may use one or more rules and logic to quickly translate a link's intended destination into a link appropriate for an international user and his relevant Internet store. A redirection service may, after a link is translated, encode it with the appropriate affiliate parameters to match the standards for the relevant affiliate network, if one exists. Matching the user's appropriate Internet store to the corresponding affiliate network and program helps to ensure that a sale will result in a commission for the owner of the site. Such a process can also provide for exchange of user level tracking parameters, for example, for seamless internal tracking.

For situations where an affiliate network allows for "user level tracking", a redirection service may pass those parameters back and forth between an affiliate network and a redirection service may optionally record such parameters (e.g., for purposes of learning, reporting, commerce, etc.).

Rerouting each user to the right item in the correct Internet store drastically improves affiliate conversion rates for a site owner (e.g., publisher). Instead of sending every click to one Internet store and hoping that store can purchase from that store, a redirection service can act to send each user to an appropriate regional Internet store where he has a better chance of finding the item and making a purchase.

It may be assumed throughout this description that each location, user, client, affiliate, etc., has appropriate hardware and software to perform various actions. Known terminals, processors, routers, switches, modems, servers, connecting links, communication methods, ISPs and/or output devices/interfaces may be used, as appropriate.

FIG. 25 shows an example of a system 2500 as including one or more processors 2510, memory 2520, one or more interfaces 2530, one or more blocks 2540 and other circuitry 2550 and an example of a method 2570 that includes various data structures 2582 and 2584. The system 2500 may be a server configured to run one or more services to serve needs of users of other computing devices, systems, etc., on a network. As an example, the system 2500 may include circuitry configured to perform one or more actions described herein. Circuitry may be in the form of hardware, software, etc. In the example of FIG. 25, the processor(s) 2510 can access the memory 2520, which may store instructions provided in the form of one or more blocks 2540. A block may be a computer-readable medium that includes processor executable instructions that instruct the system 2500 to perform various actions. In various figures, blocks are presented with respect to processes, methods, etc. Such blocks may be in the form of one or more computer-readable media. Such computer-readable media may be "non-transitory", in other words, physical media (e.g., memory, optical disk, etc.) as opposed to a transitory medium such as space, which may carry transitory signals.

As to the one or more interfaces 2530, the system 2500 may include one or more network interfaces configured for communication with the Internet, either directly or indirectly. As to the other circuitry 2550, it may include wireless circuitry configured for communication via one or more wireless networks, optionally including one or more "cellular" networks (e.g., 3G, 4G, etc.). The system 2500 may optionally be configured as a single device or as a collection of devices.

In the method 2570, an application 2572 is configured to communicate directly or indirectly via the Internet (e.g., a web browser or other application). In the example of FIG. 25, communication is shown as occurring via HTTP, noting that other types of communication may be used. The system 2500 acts to direct the application 2572 to an appropriate location 2574 (e.g., the "best" location). As shown, the system 2500 includes features to act on receipt of a URL 2582 and to formulate a redirect URL 2584. As described in various example, the redirect URL 2584 may be a "best location" URL, for example, based on logical operations performed by the system 2500, which may include one or more operations that rely on resources external to the system 2500.

The URL 2584 may be formulated according to a data structure such as, for example, a data structure shown in one or more of the FIGS. 17-23. Such data structures may be considered as having data fields, for example, as appended or concatenated to form a URL (e.g., according to standard characters such as "&", etc.). Data fields may be specific to one or more parties and may provide for one or more functions (e.g., item-related, commission-related, etc.). Such a data structure may exist at one or more locations stored in a memory (e.g., physical memory of a server, a client, etc.). Such a data structure may be formed using a process (e.g., a product formed by a process). For example, a data field or data fields may correspond to "best location" information determined by a decay process. Information included in one or more fields of the data structure may be or act as instructions to instruct an application (e.g., a browser application, a server application, etc.) to perform one or more actions (e.g., access information, transmit information, package information, etc.). As an example, information may optionally be structured according to an API call that causes a machine to perform one or more operations and optionally return information.

As an example, the system 2500 may include a URL parser block for parsing a received URL (e.g., URL 2582) to provide information to a logic block for formulating a new URL (e.g., URL 2584). A received URL may optionally include special metadata dictated by a redirection service (e.g., a service ID, etc.) that may instruct the system 2500 to use certain parser features, logic, etc. More generally, a received URL may include information such as one or more of an application ID, a client ID, a user ID, a store (e.g., iTunes, amazon.com, etc.) or a country a link is associated with (US, DE, etc.). The system 2500 may respond to receipt of such information and formulate a new URL for redirection to an appropriate location (e.g., as determined by a process performed at least in part by the system 2500).

Instructions for performing operations described herein may optionally be stored in a computer (e.g. a computer, a phone, a tablet, etc., with circuitry such as a processor) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus. A computer-readable medium can include any mechanism for storing information in a form readable by a machine (e.g., a computer).

CONCLUSION

Although various examples of methods, devices, systems, etc., have been described in language specific to structural features and/or methodological acts, it is to be understood that the subject matter defined in the appended claims is not necessarily limited to the specific features or acts described.

Rather, the specific features and acts are disclosed as examples of forms of implementing the claimed methods, devices, systems, etc.

What is claimed is:

1. A method comprising:

receiving a URL via an interface of a computing system responsive to activation of an Internet link by a remote user device wherein the Internet link is associated with a webpage ad for an item and at least one affiliate program wherein the URL comprises user device data and ad data and wherein the item is a desired item;

based at least in part on the user device data, via the computing system, determining a geolocation of the user device;

based at least in part on the ad data, via the computing system, determining information about the desired item;

based at least in part on the geolocation of the user device and the information about the desired item, via the computing system, generating search results for a group of items for a plurality of geo-targeted Internet stores wherein, if the group of items does not include the desired item, the group of items consists of items based on their relevance to the information about the desired item; and via the computing system, communicating the generated search results to the user device wherein the communicating the generated search results comprises formulating a URL link that directs the user device to a results webpage for the generated search results for the group of items for the plurality of geo-targeted Internet stores, wherein the URL link is encoded with respect to at least one of the at least one affiliate program.

2. The method of claim 1 wherein the communicating the generated search results for the group of items for the plurality of geo-targeted Internet stores to the user device comprises formulating a redirection URL to a webpage at a database site.

3. The method of claim 2 wherein the database site comprises a media database site.

4. The method of claim 1 wherein the generated search results for the group of items comprise search results for the item as available at each of the plurality of geo-targeted Internet stores.

5. The method of claim 1 wherein the generating search results for the group of items comprises performing queries.

6. The method of claim 5 wherein the queries comprise a query specific to an Internet store associated with the webpage ad.

7. The method of claim 5 wherein the queries comprise a query to a database of a redirection service.

8. The method of claim 5 wherein the queries comprise queries germane to a plurality of Internet stores.

9. The method of claim 1 wherein the webpage ad comprises an HTML page ad that comprises an image.

10. The method of claim 1 wherein the ad data comprises price.

11. The method of claim 10 wherein the price comprises an original price.

12. The method of claim 10 wherein the prices comprises a sale price.

13. The method of claim 10 comprising storing the price to a database.

14. The method of claim 13 comprising tracking the price of the item.

15. A computing system comprising:

an interface that receives a URL responsive to activation of an Internet link by a remote user device wherein the Internet link is associated with a webpage ad for an item and at least one affiliate program wherein the URL comprises user device data and ad data and wherein the item is a desired item;

processor-based circuitry that, based at least in part on the user device data, determines a geolocation of the user device;

processor-based circuitry that, based at least in part on the ad data, determines information about the desired item;

processor-based circuitry that, based at least in part on the geolocation of the user device and the information about the desired item, generates search results for a group of items for a plurality of geo-targeted Internet stores wherein, if the group of items does not include the desired item, the group of items consists of items based on their relevance to the information about the desired item; and processor-based circuitry that communicates the generated search results to the user device wherein the processor-based circuitry that communicates the generated search results to the user device comprises processor-based circuitry that formulates a URL link that directs the user device to a results webpage for the generated search results for the group of items for the plurality of geo-targeted Internet stores, wherein the URL link is encoded with respect to at least one of the at least one affiliate program.

* * * * *